US010120551B2

(12) United States Patent
Park

(10) Patent No.: US 10,120,551 B2
(45) Date of Patent: Nov. 6, 2018

(54) METHOD AND DEVICE FOR DISPLAYING SEPARATED CONTENT ON A SINGLE SCREEN

(71) Applicant: SAMSUNG ELECTRONICS CO., LTD., Suwon-si (KR)

(72) Inventor: Ji-hoon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 607 days.

(21) Appl. No.: 14/493,731

(22) Filed: Sep. 23, 2014

(65) Prior Publication Data

US 2015/0089414 A1 Mar. 26, 2015

(30) Foreign Application Priority Data

Sep. 23, 2013 (KR) ........................ 10-2013-0112853

(51) Int. Cl.
*G06F 3/0484* (2013.01)
*G06F 3/0481* (2013.01)
*G06F 3/0483* (2013.01)
*G06F 3/0485* (2013.01)
*G06F 3/0488* (2013.01)

(52) U.S. Cl.
CPC ........ *G06F 3/04847* (2013.01); *G06F 3/0481* (2013.01); *G06F 3/0483* (2013.01); *G06F 3/0485* (2013.01); *G06F 3/04842* (2013.01); *G06F 3/04845* (2013.01); *G06F 3/04883* (2013.01); *G06F 3/04886* (2013.01); *G06F 2203/04803* (2013.01)

(58) Field of Classification Search
CPC .. G06F 3/0482; G06F 3/0488; G06F 3/04886; G06F 2203/04803
See application file for complete search history.

(56) References Cited

U.S. PATENT DOCUMENTS

| 6,760,048 | B1 | 7/2004 | Bates et al. |
| 7,773,075 | B2 | 8/2010 | Otsuka et al. |
| 7,853,553 | B2 | 12/2010 | Lankinen et al. |
| 9,158,448 | B2 * | 10/2015 | Yamamoto ............ G06F 3/0412 |

(Continued)

FOREIGN PATENT DOCUMENTS

| CN | 101042624 A | 9/2007 |
| CN | 102722476 A | 10/2012 |

(Continued)

OTHER PUBLICATIONS

Communication dated Dec. 22, 2014, issued by the International Searching Authority in counterpart International Application No. PCT/KR2014/008781.

(Continued)

*Primary Examiner* — Namitha Pillai
(74) *Attorney, Agent, or Firm* — Sughrue Mion, PLLC

(57) ABSTRACT

Provided are a method and device for displaying content. The method includes: receiving, by a device, a setting input for reference content while content is displayed on a screen; displaying, on the screen of the device, a division line indicating division of the content included in a page that received the setting input; receiving a selection input on content divided based on the division line; and setting, as the reference content, the content selected based on the selection input.

29 Claims, 24 Drawing Sheets

(56) References Cited

U.S. PATENT DOCUMENTS

| | | |
|---|---|---|
| 9,552,099 B2 | 1/2017 | Yamamoto |
| 9,557,904 B2 | 1/2017 | Oshima |
| 2007/0220022 A1* | 9/2007 | Lankinen .......... G06F 17/30569 |
| 2007/0222769 A1* | 9/2007 | Otsuka ............... G01C 21/3664 |
| | | 345/173 |
| 2007/0294630 A1 | 12/2007 | Duncan et al. |
| 2010/0085384 A1 | 4/2010 | Kim et al. |
| 2010/0199178 A1 | 8/2010 | Lim et al. |
| 2011/0107272 A1* | 5/2011 | Aguilar ............... G06F 3/04815 |
| | | 715/853 |
| 2012/0023437 A1 | 1/2012 | Moriwaki |
| 2012/0088447 A1 | 4/2012 | Kwahk et al. |
| 2013/0063384 A1 | 3/2013 | Ito |
| 2013/0103236 A1 | 4/2013 | Mehrgan |
| 2013/0103727 A1 | 4/2013 | Marcotte |

FOREIGN PATENT DOCUMENTS

| | | |
|---|---|---|
| CN | 102867039 A | 1/2013 |
| EP | 1837748 A1 | 9/2007 |
| JP | 5-20011 A | 1/1993 |
| JP | 6-274090 A | 9/1994 |
| JP | 2001-209523 A | 8/2001 |
| JP | 2001-325054 A | 11/2001 |
| JP | 2002-116903 A | 4/2002 |
| JP | 2007-257220 A | 10/2007 |
| JP | 2011-242820 A | 12/2011 |
| JP | 2012-27562 A | 2/2012 |
| JP | 2012-243116 A | 12/2012 |
| JP | 2013-114558 A | 6/2013 |
| JP | 2013-161446 A | 8/2013 |
| KR | 1020090013943 A | 2/2009 |
| KR | 1020090118179 A | 11/2009 |
| KR | 1020120059909 A | 6/2012 |
| WO | 2013080510 A1 | 6/2013 |

OTHER PUBLICATIONS

Communication dated Feb. 28, 2017 issued by the Japanese Patent Office in counterpart Japanese Patent Application No. 2016-544293.
Communication dated Mar. 17, 2017 issued by the European Patent Office in counterpart European Patent Application No. 14845923.3.
Communication dated Jun. 29, 2017, issued by the European Patent Office in counterpart European Patent Application No. 14845923.3.
Communication dated Jul. 28, 2017, issued by the European Patent Office in counterpart European Patent Application No. 14845923.3.
Communication dated Jul. 18, 2017, issued by the Japanese Patent Office in counterpart Japanese Patent Application No. 2016-544293.
Communication dated Jun. 5, 2018, issued by the State Intellectual Property Office of the People's Republic of China in counterpart Chinese Patent Application No. 201480062069.5.

* cited by examiner

FIG. 10
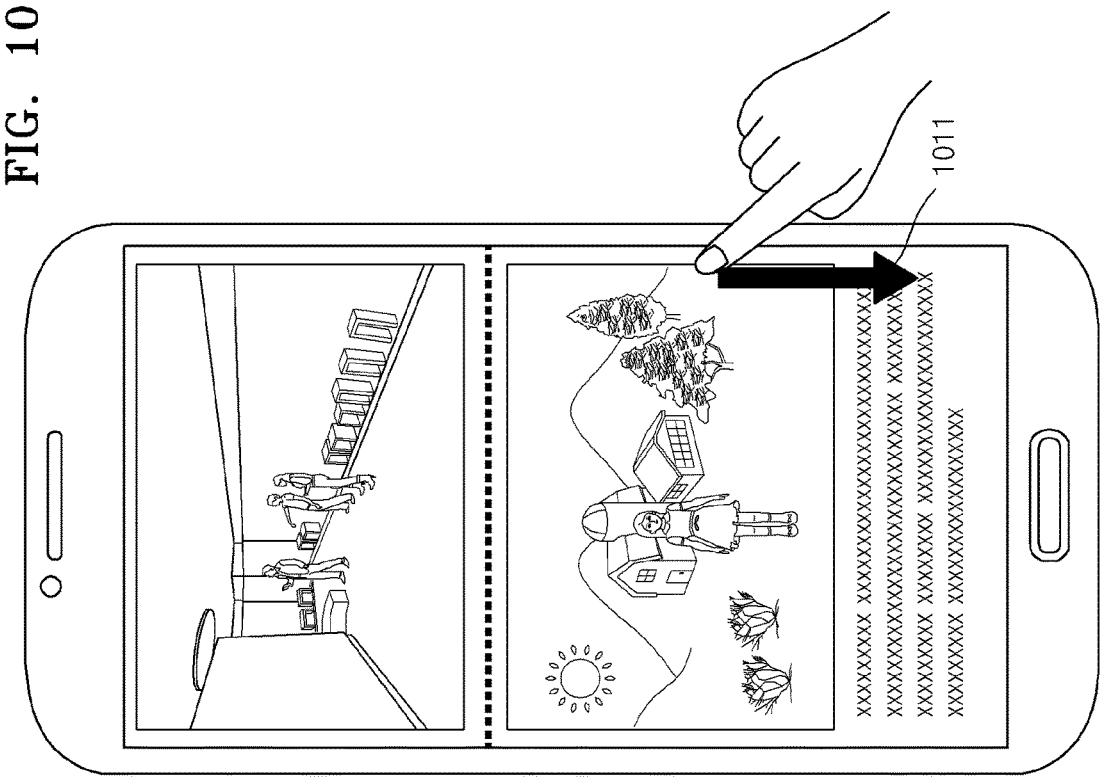
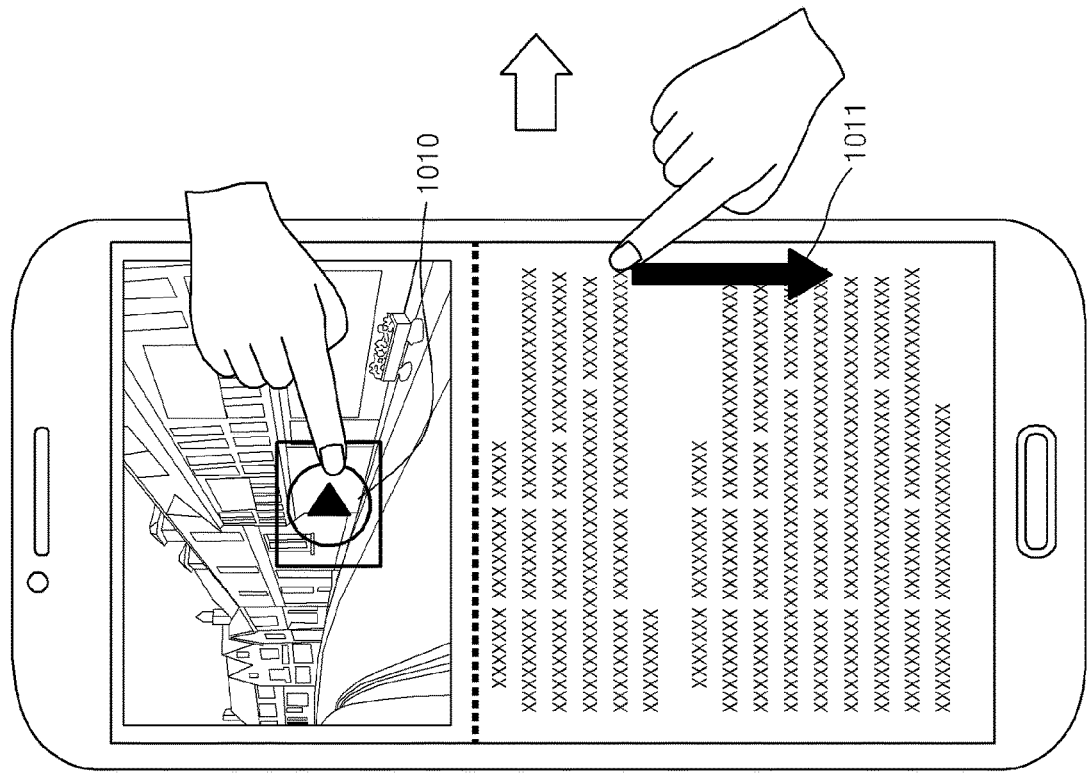

METHOD AND DEVICE FOR DISPLAYING SEPARATED CONTENT ON A SINGLE SCREEN

CROSS-REFERENCE TO RELATED APPLICATION

This application claims priority from Korean Patent Application No. 10-2013-0112853, filed on Sep. 23, 2013 in the Korean Intellectual Property Office, the disclosure of which is incorporated herein in its entirety by reference.

BACKGROUND

1. Field

Apparatuses and methods consistent with exemplary embodiments relate to displaying content.

2. Description of the Related Art

As a result of the rapid development of communication technologies and devices, an increasing amount of content is viewable via one device. For example, content such as drawings, pictures, videos, news, books, theses, documents, etc., is viewable via a single device.

However, content that is viewable at the same time is limited due to a screen size of the device. In detail, when content that a user wants to simultaneously view is separated from each other, it may be difficult to view the content through one screen.

SUMMARY

Aspects of one or more exemplary embodiments provide a method and a device for displaying contents, wherein contents separated from each other are simultaneously viewable through one screen.

Additional aspects will be set forth in part in the description which follows and, in part, will be apparent from the description, or may be learned by practice of exemplary embodiments.

According to an aspect of an exemplary embodiment, there is provided a method of displaying content, the method including: receiving, by a device, a setting input for reference content while content is displayed on a screen; displaying, on the screen, a division line indicating division of the content included in a page that received the setting input; receiving a selection input for content divided based on the division line; and setting, as the reference content, the content selected based on the selection input.

The division line may be a virtual division line.

The displaying the division line may include generating the division line based on layout information of the content included in the page.

The setting the content may include displaying the reference content on a second window that is independent from a first window on which the content included in the page is displayed.

The method may further include, in response to receiving a hiding request input for the reference content, setting a display layer of the second window to be lower than a display layer of the first window to hide the second window.

The method may further include, in response to receiving a hiding request input for the reference content, setting a display layer of the second window to be lower than a display layer of the first window to hide the second window and displaying an indicator that indicates a hidden state of the second window on at least one of a display location in the first window, a boundary line of the first window, and a display location adjacent to the first window.

The method may further include, in response to receiving an execution command for the reference content, executing the reference content in the second window.

The method may further include, in response to receiving a note request input for the reference content, opening a third window for inputting a note for the reference content.

The opening the third window may include opaquely displaying the third window adjacent to or on the second window.

The method may further include, in response to receiving a hiding request input for the third window, hiding or closing the third window.

The method may further include, in response to receiving a hiding request input for the third window, closing the third window and displaying an indicator that indicates a hidden state of the third window on at least one of a display location in the second window, a boundary line of the second window, and a display location adjacent to the second window.

The setting the content may further include displaying the second window in a top layer.

The method may further include, in response to receiving a setting release input for the reference content from the device, closing the second window.

The setting the content may further include displaying an indicator that indicates the reference content on at least one of a display location in the second window, a boundary line of the second window, and a display location adjacent to the second window.

The method may further include, after the division line is displayed, displaying an additional division line in response to receiving a division line setting input.

The method may further include, after the division line is displayed, deleting a part or all of the division line in response to receiving a division line delete input.

An input or a command may be received according to a touch-based gesture.

According to an aspect of another exemplary embodiment, there is provided a device including: a user input configured to receive a setting input for reference content; a display configured to display content; and a controller configured to receive the setting input for the reference content while the content is displayed on the display, to display, on the display, a division line indicating division of content included in a page that received the setting input, to receive a selection input on content divided based on the division line, and to set, as the reference content, the content selected based on the selection input.

According to an aspect of another exemplary embodiment, there is provided a method of setting content, the method including: receiving, by a device, a division line input to display a division line on content that is displayed on a screen; receiving a selection input for a portion of the content divided based on the division line; and setting, as reference content, the portion of the content selected based on the selection input.

According to an aspect of another exemplary embodiment, there is provided a computer-readable recording medium having recorded thereon a program for executing the method.

BRIEF DESCRIPTION OF THE DRAWINGS

These and/or other aspects will become apparent and more readily appreciated from the following description of exemplary embodiments, taken in conjunction with the accompanying drawings in which:

FIG. 10 is a diagram of displaying content after reference content is set, according to an exemplary embodiment;

DETAILED DESCRIPTION OF EXEMPLARY EMBODIMENTS

Figure 1A:
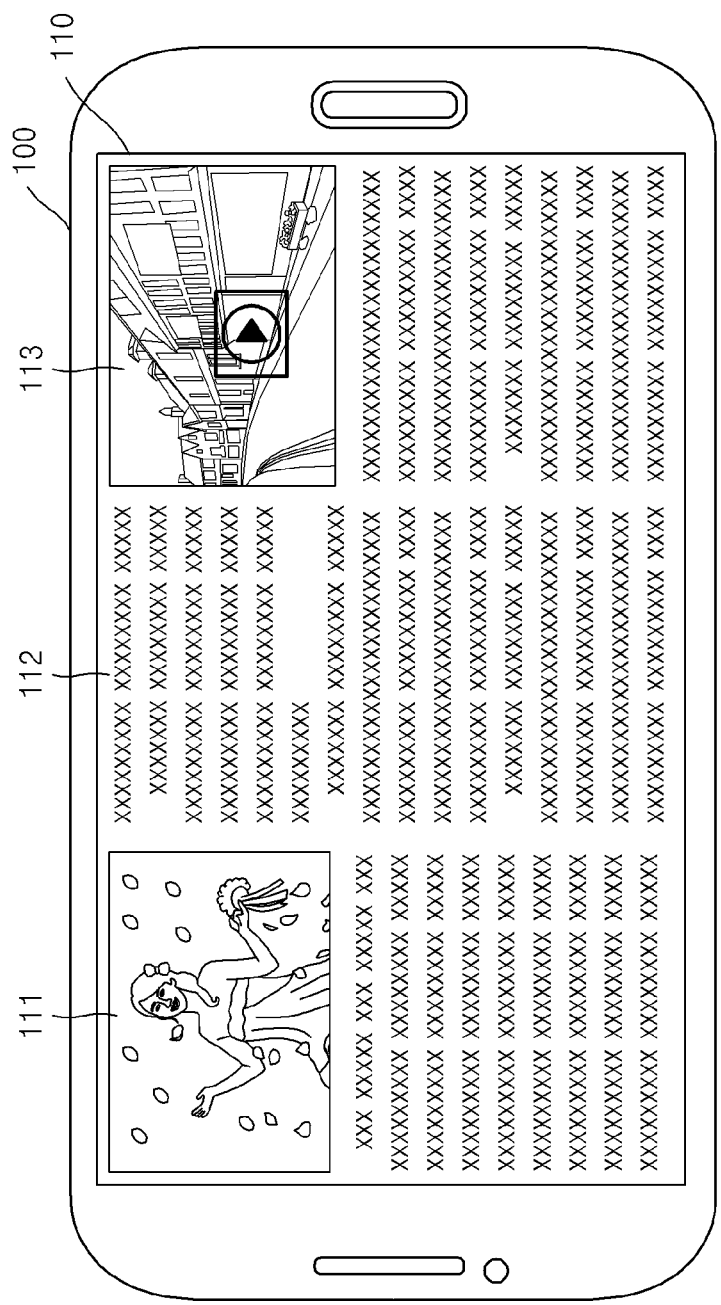
FIGS. 1A through 1C are diagrams for describing content and reference content according to one or more exemplary embodiments.

Terms used herein will now be briefly described and one or more exemplary embodiments will be described in detail.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of exemplary embodiments. Thus, the terms used herein are to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

As used herein, the term "and/or" includes any and all combinations of one or more of the associated listed items. Expressions such as "at least one of," when preceding a list of elements, modify the entire list of elements and do not modify the individual elements of the list.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, exemplary embodiments are merely described below, by referring to the figures, to explain aspects of the present description FIGS. 1A through 1C are diagrams for describing content and reference content according to one or more exemplary embodiments.

Figure 1B:
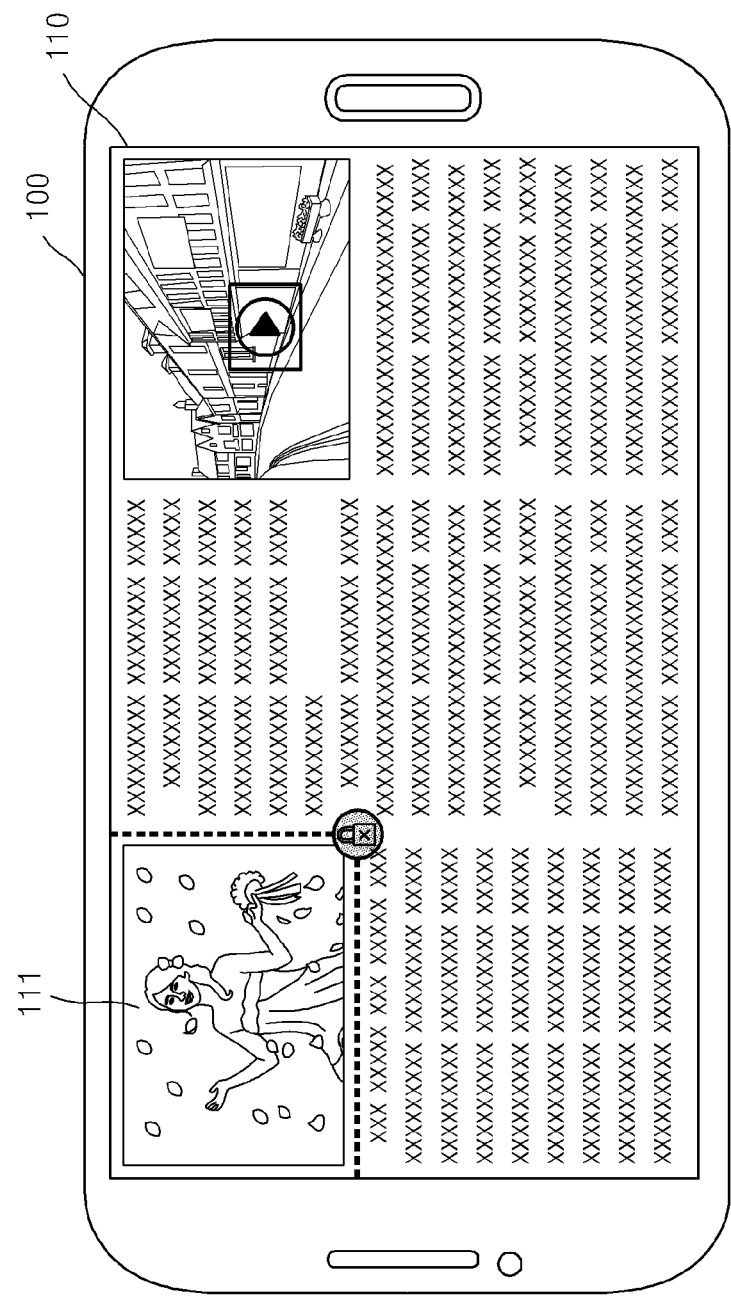
Figure 1C:
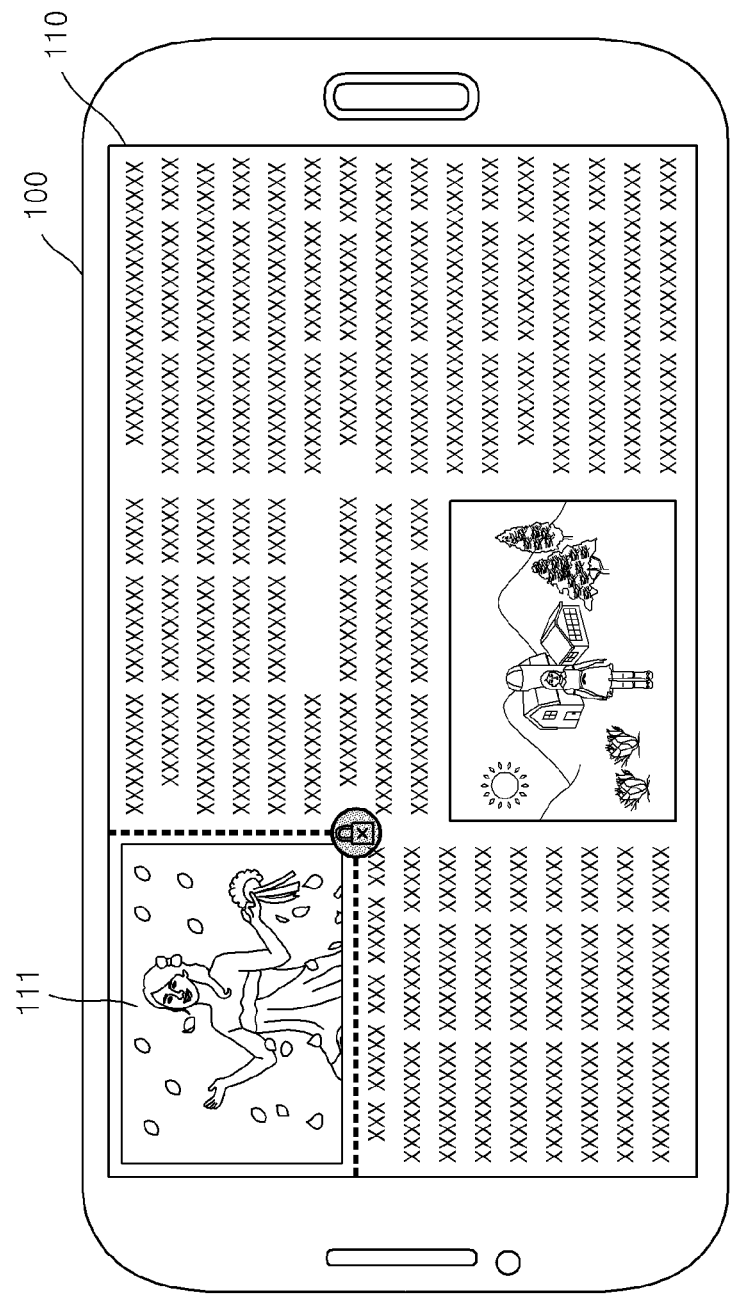

FIG. 1A illustrates a screen 110 of a device 100 on which content is being displayed. Referring to FIG. 1A, content displayable on the screen 110 may be multimedia content including at least one of a drawing 111, text 112, and a video 113, although it is understood that one or more other exemplary embodiments are not limited thereto.

Content displayed on the screen 110 of the device 100 may be in a page unit. For example, content currently being displayed on the screen 110 of FIG. 1A may be content included in a current page, content displayed on the screen 110 immediately before the current page may be content included in a previous page, and content to be displayed on the screen 110 immediately after the current page may be content included in a next page.

Alternatively, content displayed on the screen 110 may be in a screen unit. For example, content displayed on the screen 110 may be content included in a current screen, content included in a previous screen, or content included in a next screen.

The content included in the previous page, the content included in the current page, and the content included in the next page may partially overlap each other according to content to be displayed on the screen 110. For example, when content for which pages are not designated, such as web news, is displayed on the screen 110, the content included in the previous page and the content included in the current page may partially overlap, and the content included in the current page and the content included in the next page may partially overlap. Even for content for which pages are designated, if the content is displayed on the screen 110 in a continuously viewable form (and not a page unit) according to a user input, such as an up-and-down scroll, a left-and-right scroll, a swipe, etc., content included in a page may partially overlap.

Content included in a page, according to one or more exemplary embodiments, may be different from content included in an actual page. For example, when content is classified according to pages, such as in the case of an electronic book, and the content is displayed on the screen 110 according to two page units, content included in one page may correspond to content included in two pages of the electronic book.

Content according to one or more embodiments may include a document file, an electronic book, Internet news, a web page provided by a web portal, a thesis (i.e., a paper), etc., although it is understood that one or more other exemplary embodiments are not limited thereto. With respect to the aforementioned content, content included in one page according to one or more exemplary embodiments may be a part of the document file, a part of the electronic book, a part of the Internet news, all or a part of the web page, or a part of the thesis.

An amount of content included in one page, according to one or more exemplary embodiments, may differ according to a size of the screen 110. For example, when a size of the screen 110 is 5 inches, an amount of content included in one page may be less than that when a size of the screen 110 is 10 inches. Alternatively, an amount of content included in one page may be the same regardless of a size of the screen 110, and a display size of information included in the content may differ according to the size of the screen 110.

FIG. 1B illustrates a screen in which reference content is selected. In FIG. 1B, the drawing 111 included in a page displayed on the screen 110 of FIG. 1A is selected as reference content by way of example.

Reference content is information to be referred to while a user views content using the device 100. The reference content may be a part of information included in the content, or information not included in the content. For example, when the user is viewing a thesis through the device 100, reference content may be a part of information included in the thesis or information not included in the thesis, e.g., part of information included in another thesis or document different from the thesis currently viewed through the device 100. When the reference content is a part of information not included in the content, the reference content may be read or obtained by the user from pre-stored information (e.g., information stored as reference content). Such pre-stored reference content may be stored in the device 100, in a server connectable to the device 100, in an external device (or another device) connectable to the device 100, etc. The external device has a storage function, and may be an external processing device or an external storage device (such as a flash memory, a hard disk drive, an optical storage medium, etc.)

When the reference content is information included in the content (e.g., thesis) currently viewed by using the device 100, the reference content may be information to be referred to while viewing information other than the reference content, from among information included in the content. When the reference content is information not included in the content currently viewed by using the device 100, the reference content may be information to be referred to while viewing the information included in the content.

FIG. 1C illustrates the screen 110 of another page after reference content is selected. As shown in FIG. 1C, even when content displayed on the screen 110 of the device 100 is changed (or a page is switched), the display of the reference content is maintained. Accordingly, the user may view content that does not include the reference content (e.g., content of another page) while viewing the reference content through the screen 110 of the device 100.

As shown in FIG. 1C, in order to view the reference content through the screen 110 of the device 100, the reference content may be displayed on a window that is independent from a window of the content being displayed through the screen 110 of the device 100.

Figure 2A:
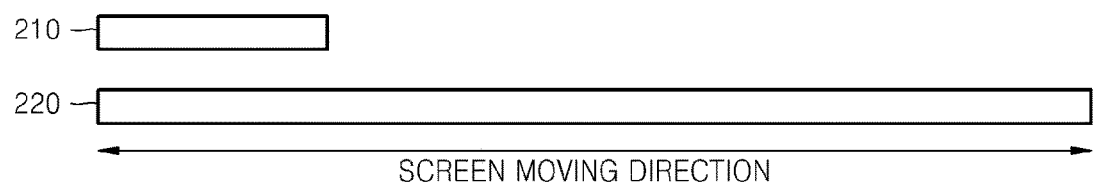
FIGS. 2A through 2C are diagrams for describing a relationship between a window of reference content and a window of content, according to one or more exemplary embodiments.
Figure 2B:
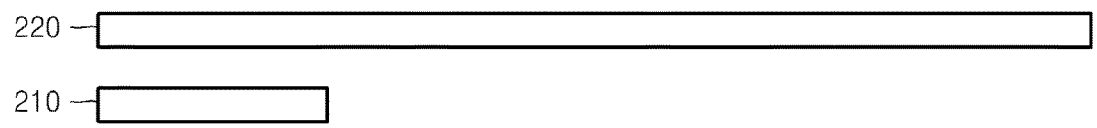
Figure 2C:
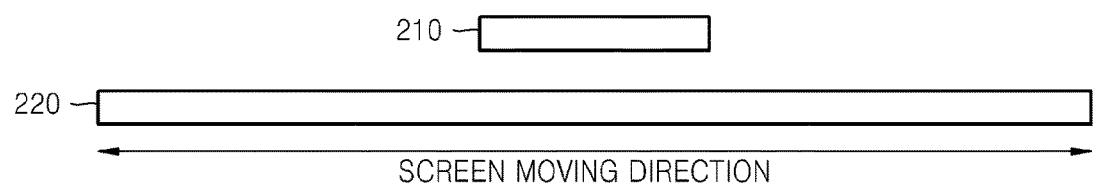

FIGS. 2A through 2C are diagrams for describing a relationship between a window 210 of reference content and a window 220 of content displayed on the screen 110 of the device 100, according to one or more exemplary embodiments.

In order to display reference content according to one or more exemplary embodiments, a display layer of the window 210 of the reference content is set to be higher than a display layer of the window 220 of the content, as shown in FIG. 2A. The display layer of the window 210 of the reference content may be at a top level. Furthermore, a display state of the window 210 of the reference content may be in an opaque state. Accordingly, the user is unable to view information included in a display region on the window 220 of the content, which overlaps the window 210 of the reference content. According to another exemplary embodiment, a display state may be semi-transparent or may be adjustable by a user (i.e., a transparency level may be adjustable by a user)

If the user wants to view the information included in the display region on the window 220 of the content that overlaps the window 210 of the reference content, the display layer of the window 210 of the reference content may be set to be lower than the display layer of the window 220 of the content, as shown in FIG. 2B, according to an exemplary embodiment. Accordingly, the user is able to view the information included in the display region of the window 220 of the content that was hidden by the window 210 of the reference content.

In order to view the information in the display region of the window 220 of the content that is hidden by the window 210 of the reference content, a display location of the window 210 of the reference content may be moved, as shown in FIG. 2C, according to a user input.

Figure 3:
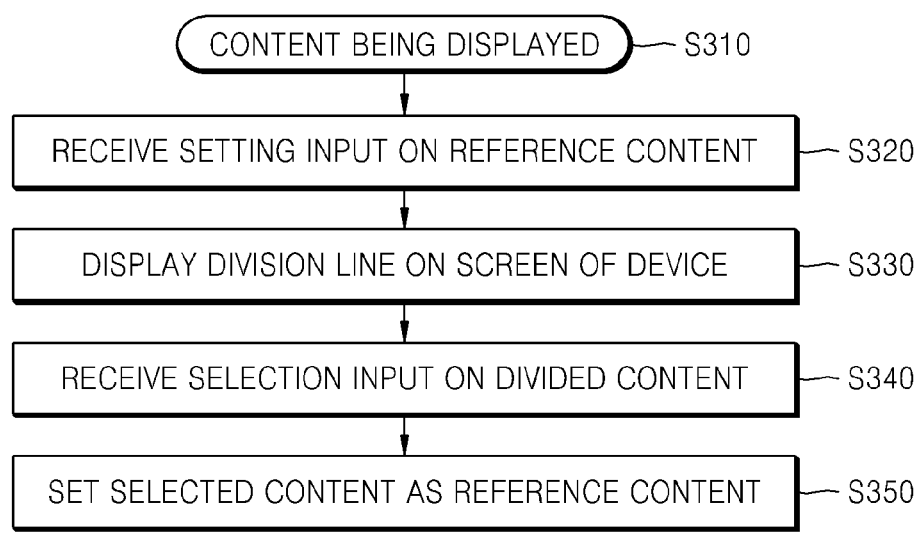
FIG. 3 is a flowchart of a method of displaying content, which is performed by a device, according to an exemplary embodiment.
Figure 4:
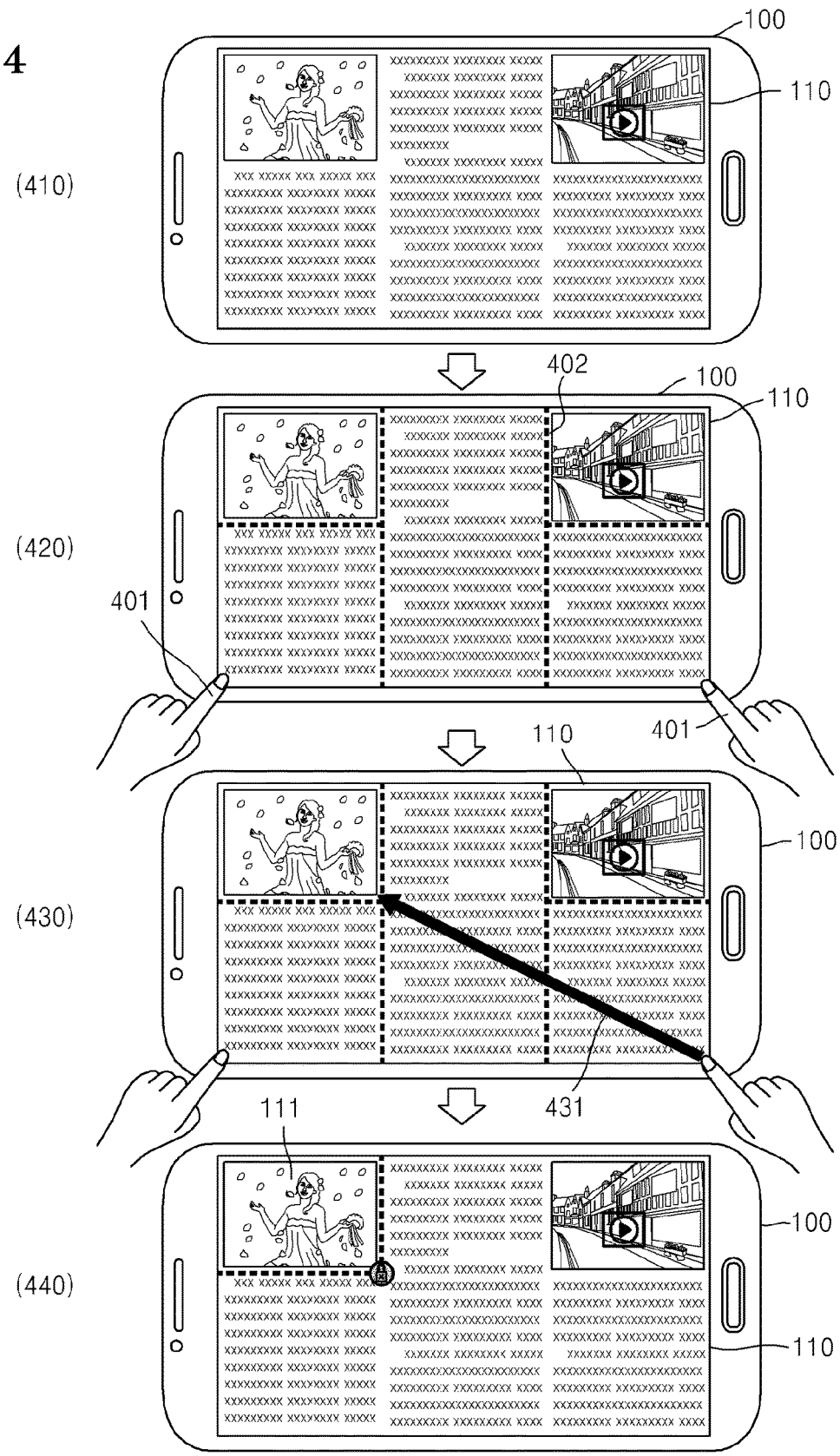
FIG. 4 shows diagrams of the content displayed on a screen of the device according to the method of FIG. 3.

FIG. 3 is a flowchart of a method of displaying content, which is performed by the device 100, according to an exemplary embodiment. FIG. 4 shows diagrams of the content displayed on the screen 110 of the device 100 according to the method of FIG. 3. The method of FIG. 3 will now be described with reference to FIG. 4.

When a setting input 401 for reference content is received (as shown in (420) of FIG. 4) in operation S320 while content is displayed on the screen 110 of the device 100 (as shown in (410) of FIG. 4) in operation S310, the device 100 displays a division line 402 on the screen 110 in operation S330.

As shown in (420) of FIG. 4, the setting input 401 includes a multi-touch input on two bottom corners of the screen 110, although it is understood that one or more other exemplary embodiments are not limited thereto. The multi-touch input may be performed by both hands of the user or two fingers of one hand of the user depending on a size of the screen 110. If the multi-touch input is received for a predetermined period of time, the multi-touch input may be recognized as the setting input 401.

The setting input 401 may include one of a multi-touch input on two top corners of the device 100, a multi-touch input on two left corners of the device 100, a multi-touch input on two right corners of the device 100, etc.

Figure 5:
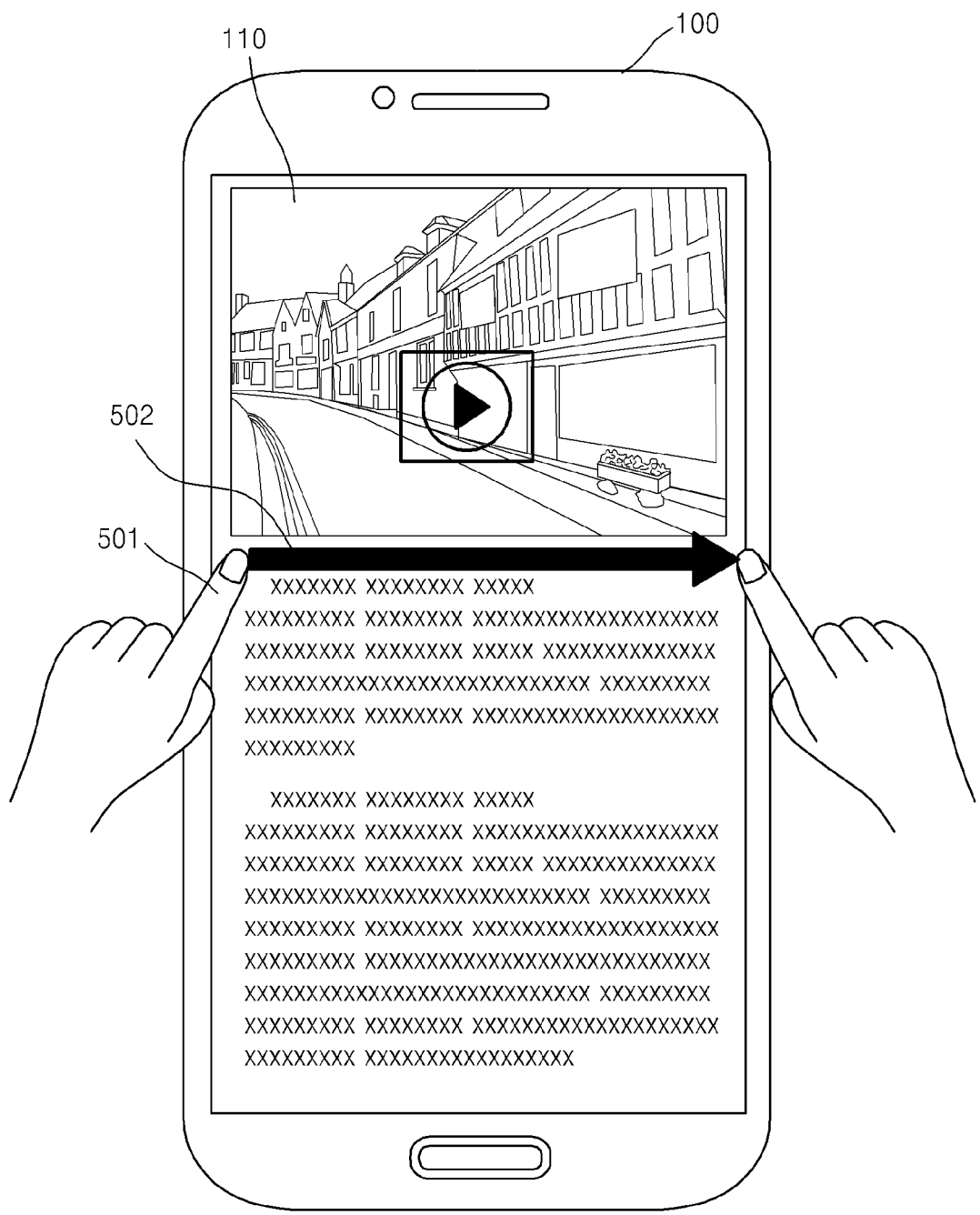
FIG. 5 is a diagram for describing an input for setting reference content, according to an exemplary embodiment.

FIG. 5 is a diagram for describing a setting input on reference content, according to another exemplary embodiment. Referring to FIG. 5, the setting input may include a touch gesture in which a finger touches, as shown by a reference numeral 501, a leftmost point of the screen 110 while another finger drags, as shown by a reference numeral

502, from a neighboring point of the leftmost point to a rightmost point of the screen 110 in a horizontal direction.

Similarly, the setting input may include a touch gesture in which a finger touches a rightmost point of the screen 110 while another finger drags from a neighboring point of the rightmost point to a leftmost point of the screen 110 in a horizontal direction.

Furthermore, the setting input may include a touch gesture in which a finger touches an uppermost point of the screen 110 while another finger drags from a neighboring point of the uppermost point to a lowermost point of the screen 110 in a vertical direction.

Additionally, the setting input may include a touch gesture in which a finger touches a lowermost point of the screen 110 while another finger drags from a neighboring point of the lowermost point to an uppermost point of the screen 110 in a vertical direction.

Two fingers used for the setting input may be fingers of the same hand or different hands. Similarly, while the above-described exemplary embodiments are with respect to a touch gesture achieved by one or more fingers, it is understood that one or more other exemplary embodiments are not limited thereto. For example, according to another exemplary embodiment, the touch gesture may be achieved by an input device such as a stylus.

The division line 402 shown in (420) of FIG. 4 is a line indicating division of content. The division line 402 is used to guide the user with respect to units of content settable as reference content, and thus may be a virtual division line or a guide line. The content on which the division line 420 is displayed is content included in a page displayed on the screen 110 when the setting input is received. The content may be displayed in operation S310 as the device 100 executes an application, such as a content reproduction application or a content reader application, although it is understood that one or more other exemplary embodiments are not limited thereto.

The device 100 may generate the division line 402 by analyzing layout information of the content included in the page. The layout information may be defined in a content unit, a page unit, etc. The layout information may include identification item information (for example, an equation, title information, and content type information such as text, a drawing, or a video), paragraph identification information (for example, paragraph information, page information, and column information), and content location information (for example, location information represented by using at least one of page information, column information, and paragraph information). The layout information may be included in metadata of the content. The metadata may be configured such that the layout information may be referred to in the content or page unit.

When a selection input on the content divided based on the division line 402 is received in operation S340 (as shown in (430) of FIG. 4), the device 100 sets content selected based on the selection input, i.e., the drawing 111, as reference content in operation S350 (as shown in (440) of FIG. 4). The content set as the reference content may be separately stored to be managed by the device 100.

Multiple content included in one page, such as a video and text, may be set as reference content. In this case, the multiple content may be displayed in a window of reference content. Alternatively, contents included in different pages may be set as reference content. In this case, a window of reference content is separated. For example, when a part of content included in a first page is set as first reference content and a part of content included in a fifth page is set as second reference content, a window of the first reference content and a window of the second reference content are independent from each other.

When a plurality of windows of reference content are set, a display layer of a window that is set later may be higher than a display layer of a window that is previously set. In this case, a part or all of the window that is pre-set may be hidden by the window that is set later. Information (for example, an indicator such as a sign, a symbol, an icon, etc.) indicating the setting of the plurality of windows of reference contents may be displayed on a display location in the window of the reference content, the display location around the window of the reference content, or on a boundary line of the window of the content.

An order of display layers of the plurality of windows of reference content may be changed according to a user input. When display locations of the plurality of windows of reference content are different, the display layers of the plurality of windows of reference content may be the same. In this case, the plurality of windows of reference content may be simultaneously viewed through one page. A display location of a window of reference content may be determined according to a display location of selected content, and may be changed according to a user input.

When the plurality of windows of reference content are set, identification information may be assigned to each of the plurality of windows of reference content and stored in the device 100.

An indicator (for example, a sign, a symbol, an icon, a certain image like a lock or a mark, etc.) indicating reference content may be displayed on a display location in a window of the reference content, on a boundary line of the window of the reference content, a display location (display region included in a window of content) adjacent to the window of the reference content, etc. The indicator indicating the reference content and the indicator indicating the setting of the plurality of windows of reference contents may be differently set.

Referring to (430) of FIG. 4, the selection input includes a touch gesture 431 in which one of the fingers inputting a multi-touch is dragged in a direction towards content to be selected, although it is understood that one or more other exemplary embodiments are not limited thereto.

Figure 6A:
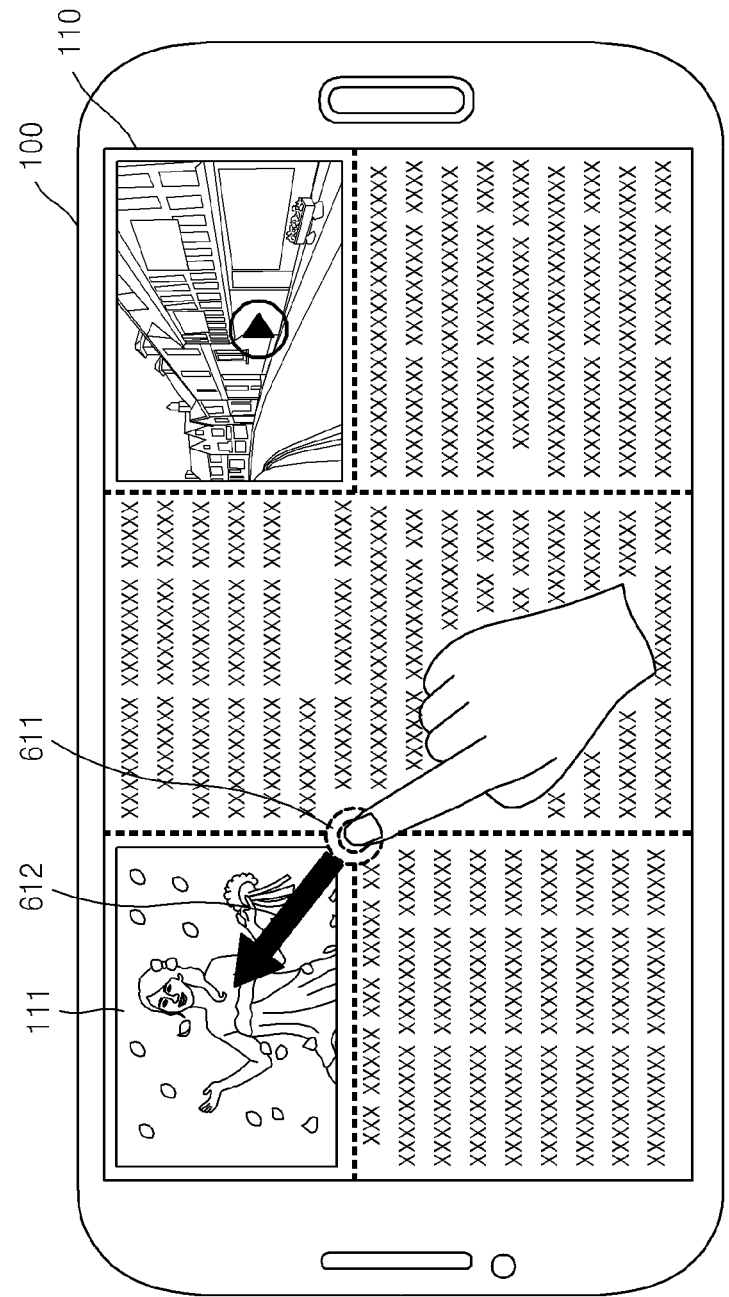
FIGS. 6A and 6B are diagrams for describing a selection input on divided content, according to an exemplary embodiment.
Figure 6B:
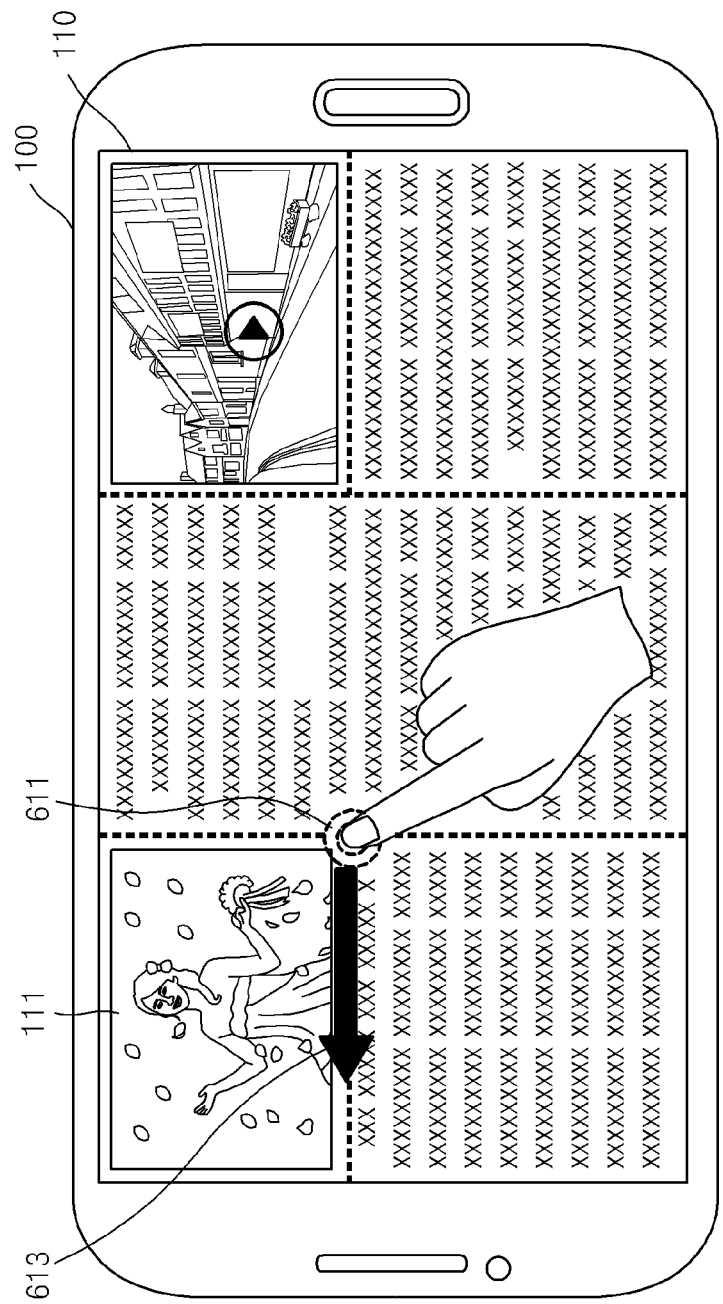

FIGS. 6A and 6B are diagrams for describing a selection input on divided content, according to another exemplary embodiment. The selection input may be based on a division line, as shown in FIGS. 6A and 6B. For example, as shown in FIG. 6A, the selection input may be based on a touch gesture in which the division line adjacent to (or around) the content to be selected is touched as shown by a reference numeral 611, and a finger touching the division line is dragged towards a display region (for example, a northwest direction when the drawing 111 is to be selected) where the content to be selected is displayed, as shown by a reference numeral 612.

When text below the drawing 111 based on the reference numeral 611 is to be selected, the selection input may be based on a touch gesture in which the finger is dragged in a southwest direction from the reference numeral 611. When the drawing 111 and the text below the drawing 111 are both to be selected, the selection input may be based on a touch gesture in which the finger is dragged along the division line from the reference numeral 611, as shown by a reference numeral 613 in FIG. 6B.

Operation S350 of FIG. 3 may be performed by displaying content selected based on the selection input on a window that is independent from the window of the content included in the page. As such, in order to display the selected content on the window that is independent from the window of the content, the device 100 may copy the selected content, open the window of reference content, and paste the copied content to the opened window of reference content, upon receiving the selection input. The window of reference content may be managed similarly to a clipboard, although it is understood that one or more other exemplary embodiments are not limited thereto.

Figure 7:
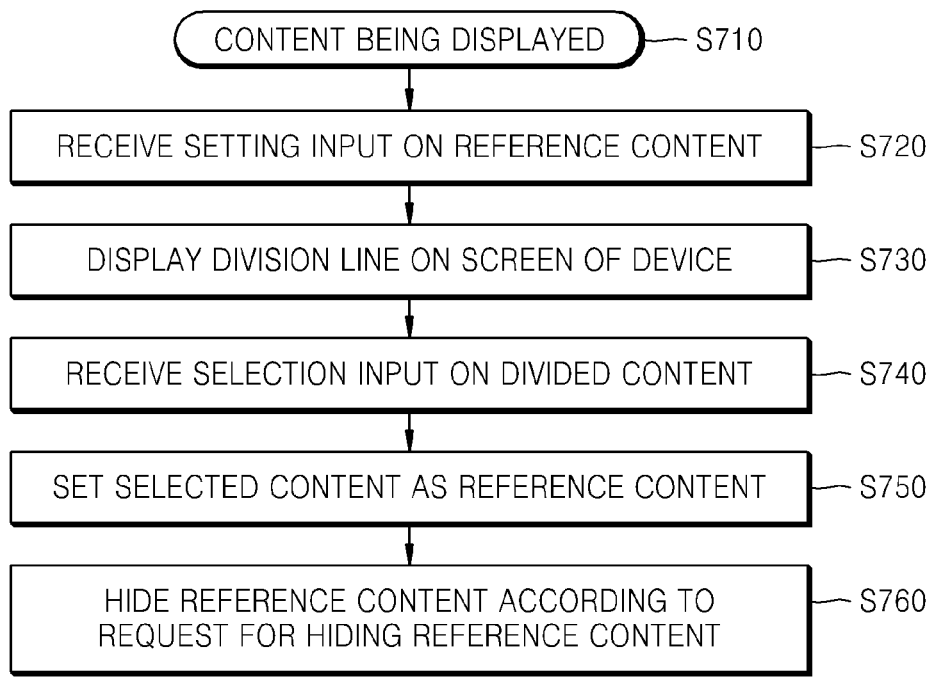
FIG. 7 is a flowchart of a method of displaying content, which is performed by a device, according to an exemplary embodiment.

FIG. 7 is a flowchart of a method of displaying content, which is performed by the device 100, according to another exemplary embodiment. In FIG. 7, an operation of hiding reference content is added as compared to the method of FIG. 3.

Since operations S710 through S750 of FIG. 7 are substantially the same as operations S310 through S350 of FIG. 3, details thereof are not repeated here.

In operation S760, the device 100 hides the reference content according to a request for hiding reference content from the user. The hiding of reference content may be performed by, as described above with reference to FIG. 2B, setting the display layer of the window of reference content to be lower than the display layer of the window of content. Accordingly, the hiding of the reference content may denote the hiding of the window of reference content.

Figure 8:
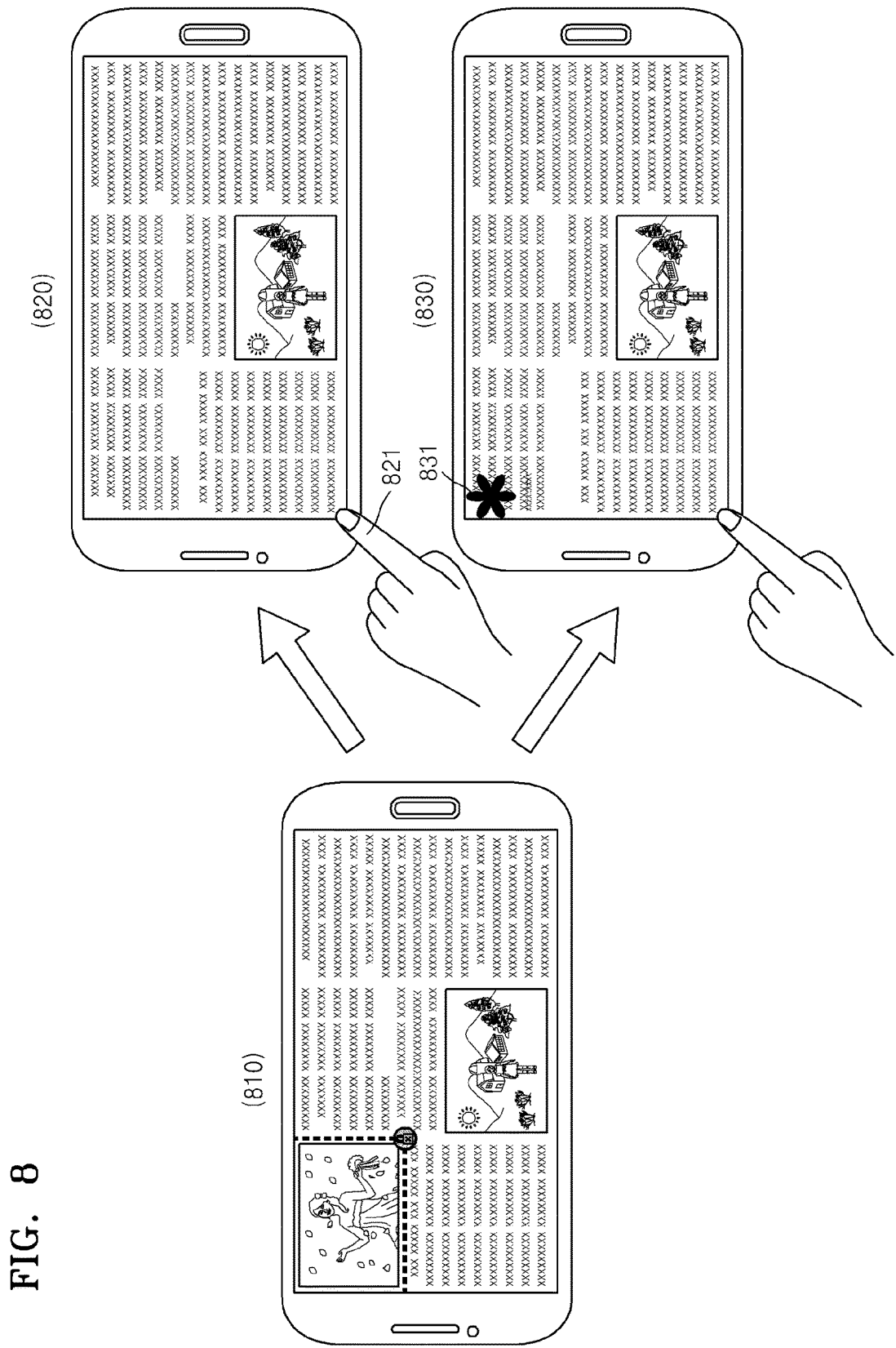
FIG. 8 is a diagram of a screen according to an operation of hiding a window of reference content, according to an exemplary embodiment.

FIG. 8 is a diagram of a screen according to an operation of hiding a window of reference content, according to an exemplary embodiment. As shown in (810) of FIG. 8, in response to receiving a user input 821 indicating a request for hiding reference content from a page where the reference content is set, the device 100 hides the window of reference content, as shown in (820) of FIG. 8. The user input 821 may be an operation of touching an indicator (e.g., a sign, a symbol, an icon, etc.) indicating the reference content for longer than a predetermined period of time, although it is understood that one or more other exemplary embodiments are not limited thereto.

Also, a sign 831 (for example, a certain image or a certain symbol) indicating a hidden state of the window of reference content may be displayed on a display location in the window of content, on the boundary line of the window of content, or a display location adjacent to the window of content, as shown in (830) of FIG. 8, so that the user easily determines that the window of reference content is a hidden page. The sign 831 may be variously set by using default information in the device 100 or by the user.

Figure 9:
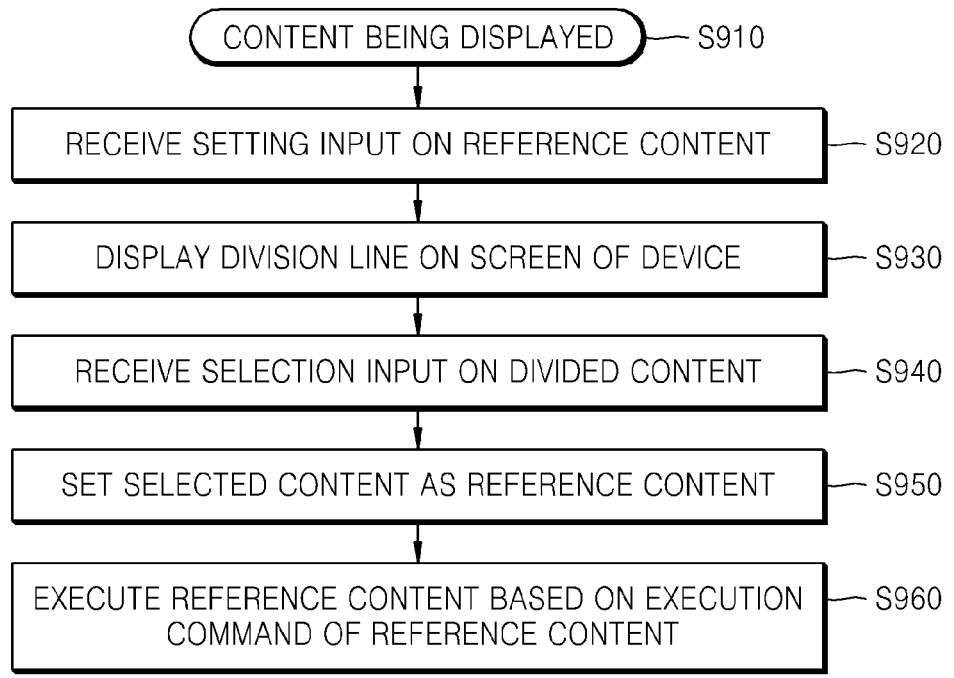
FIG. 9 is a flowchart of a method of displaying content, which is performed by a device, according to another exemplary embodiment.

FIG. 9 is a flowchart of a method of displaying content, which is performed by the device 100, according to another exemplary embodiment. In FIG. 9, an operation of executing reference content is added as compared to the method of FIG. 3.

Since operations S910 through S950 of FIG. 9 are substantially the same as operations S310 through S350 of FIG. 3, details thereof are not repeated here.

In operation 960, the device 100 executes the reference content on the window of reference content based on an execution command of the reference content from the user.

FIG. 10 is a diagram of displaying content after reference content is set according to a setting input of reference content of FIG. 5, according to an exemplary embodiment. In FIG. 5, video content is set as reference content. Upon receiving an execution request input 1010 on the reference content, the device 100 may reproduce a video on a window of the reference content while changing content according to a user input 1011 indicating an up-and-down scroll on a window of the content.

Figure 11:
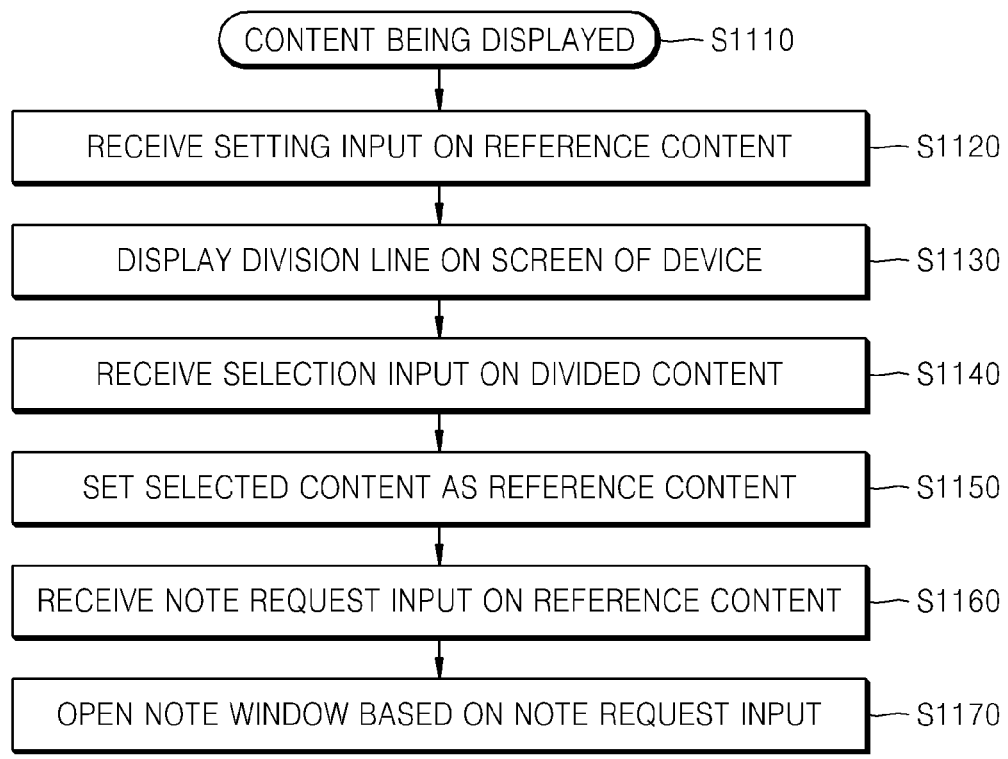
FIG. 11 is a flowchart of a method of displaying content, which is performed by a device, according to another exemplary embodiment.

FIG. 11 is a flowchart of a method of displaying content, which is performed by the device 100, according to another exemplary embodiment. In FIG. 11, a note operation on reference content is added as compared to the method of FIG. 3.

Since operations S1110 through S1150 of FIG. 11 are substantially the same as operations S310 through S350 of FIG. 3, details thereof are not repeated here.

When the device 100 receives a note request input on reference content from the user in operation S1160, the device 100 opens a note window in operation S1170. The note window is a window for receiving a note or a comment of the user on the reference content. Accordingly, the user may store the comment on the note window based on the reference content and the content displayed on the screen 110 of the device 100, and may later view the comment through the note window. The comment recorded on the note window may be mapped with the corresponding window of reference content and stored in the device 100. The note window may remain opened when the corresponding window of reference content is opened.

Figure 12A:
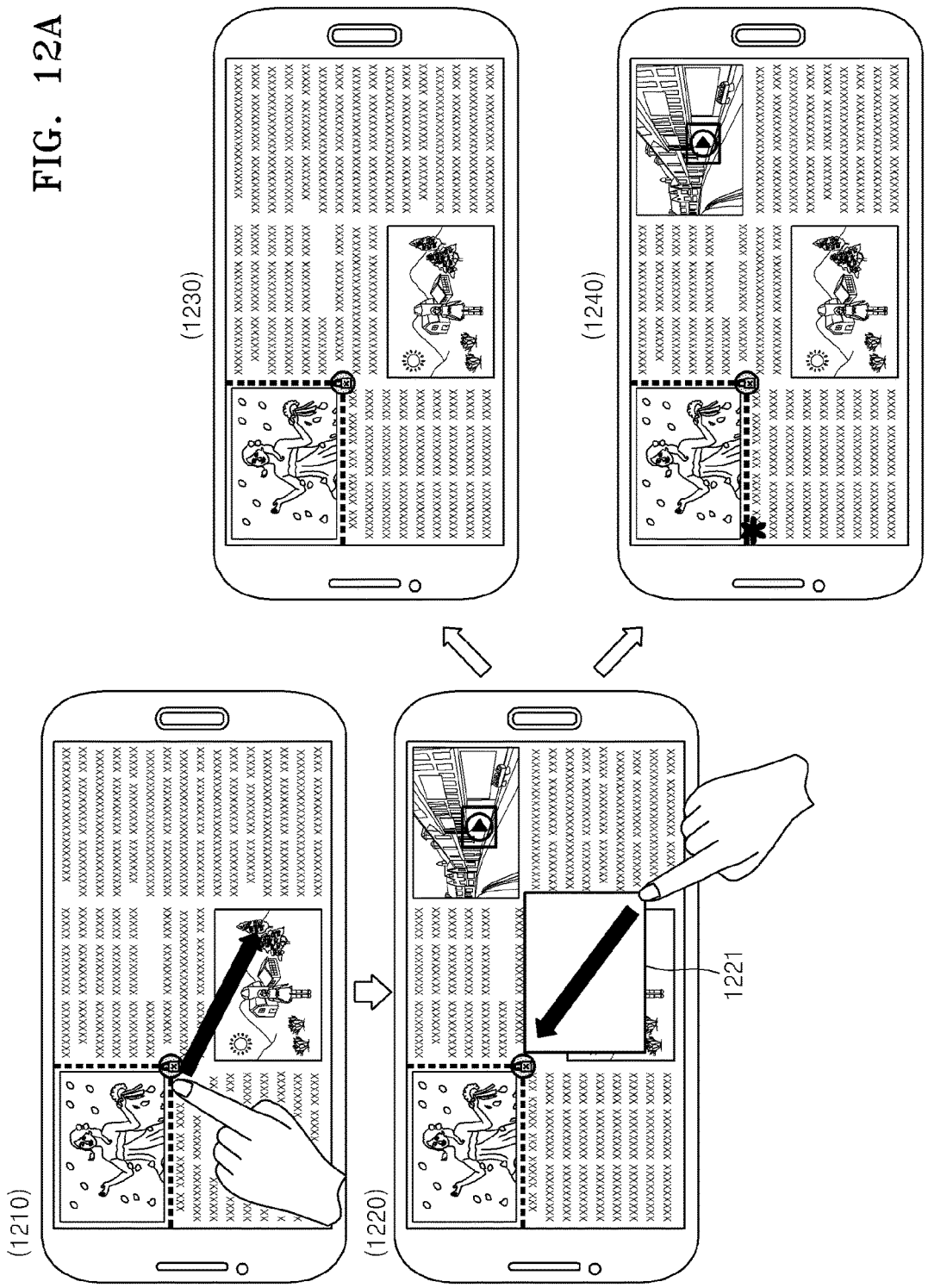
FIGS. 12A and 12B are diagrams of screens for opening and closing a note window, according to one or more exemplary embodiments.
Figure 12B:
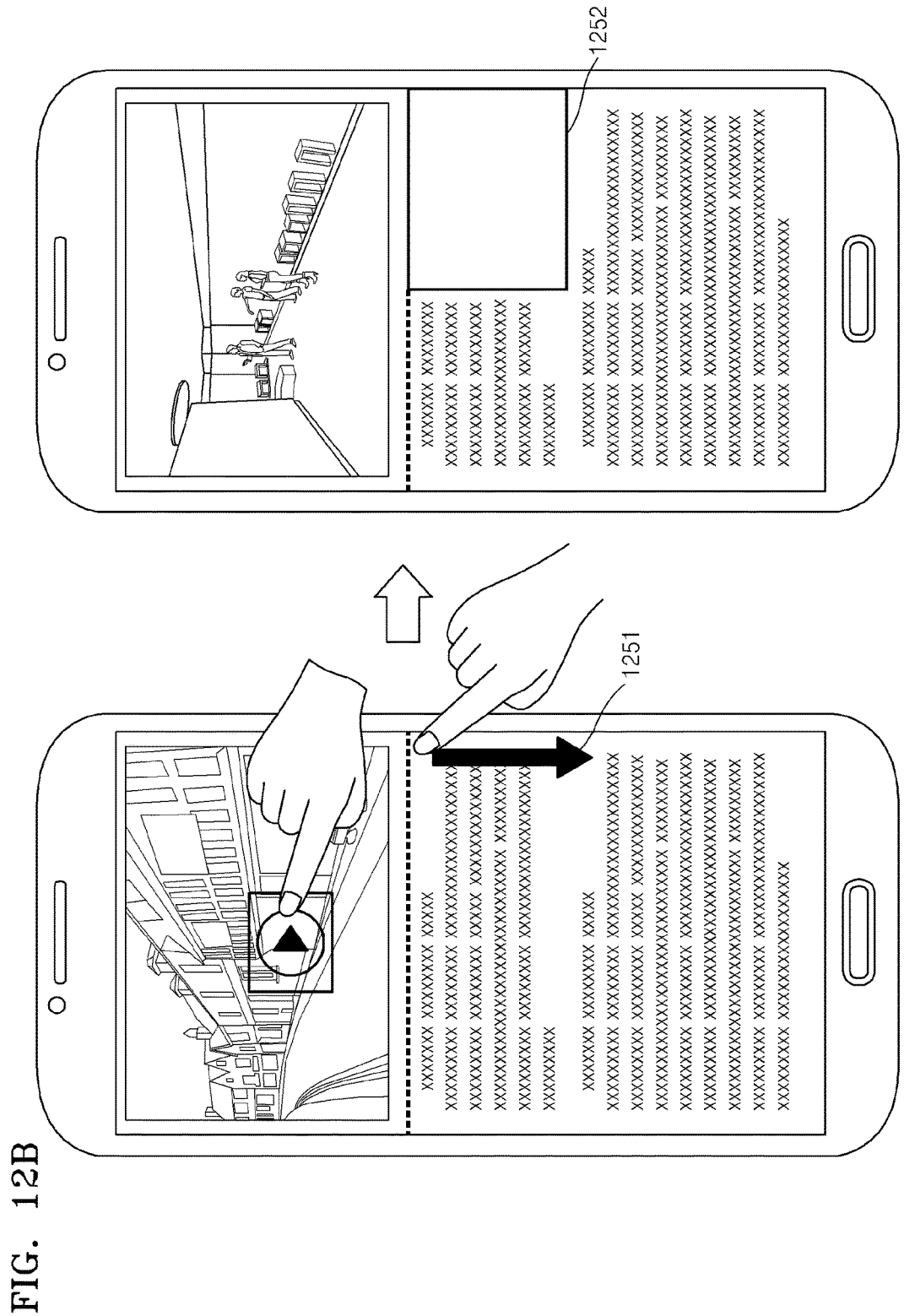

FIGS. 12A and 12B are diagrams of screens for opening and closing a note window, according to an exemplary embodiment.

As shown in (1210) of FIG. 12A, when a user input (note request input), in which a finger touches a boundary line of a window of reference content and is dragged in a desired direction to generate a note window, is received, a note window 1221 is opened on the screen 110 of the device 100, as shown in (1220) of FIG. 12A. It is understood that the note request input is not limited to the above-described input in one or more other exemplary embodiments, and any type of predetermined input may be implemented to generate the note window.

As shown in (1220) of FIG. 12A, the note window 1221 may be opaquely displayed adjacent to the window of reference content. After the note window 1221 is opened, information (comment) input by the user may be stored on the note window 1221. The information stored on the note window 1221 may be stored in the device 100, as note window data. While the note window 1221 in the present exemplary embodiment is opaquely displayed, it is understood that one or more other exemplary embodiments are not limited thereto. For example, according to another exemplary embodiment, the note window 1221 may be semi-transparently displayed.

Alternatively, a note window 1252 may be opened according to a user input (note request input) 1251, in which a finger touches a boundary line of a window of reference content and is dragged downward, as shown in FIG. 12B.

The device 100 may hide the note window 1221 as shown in (1230) of FIG. 12A, according to a hiding request input on the note window 1221. The note window 1221 may be hidden by setting a display layer of the note window 1221 to be lower than a display layer of the window of content, although it is understood that one or more other exemplary embodiments are not limited thereto. For example, according to another exemplary embodiment, the note window 1221 may be hidden by making the note window fully transparent. When the note window 1221 is hidden according to the hiding request input on the note window 1221, a sign (for example, a certain image or a certain symbol) indicating a hidden state of the note window 1221 may be displayed on a display location in the window of reference content, on a boundary line of the window of reference content, or in a display location adjacent to the window of reference content, as shown in (1240) of FIG. 12A. The display location adjacent to the window of reference content may be included in the window of content.

Figure 13:
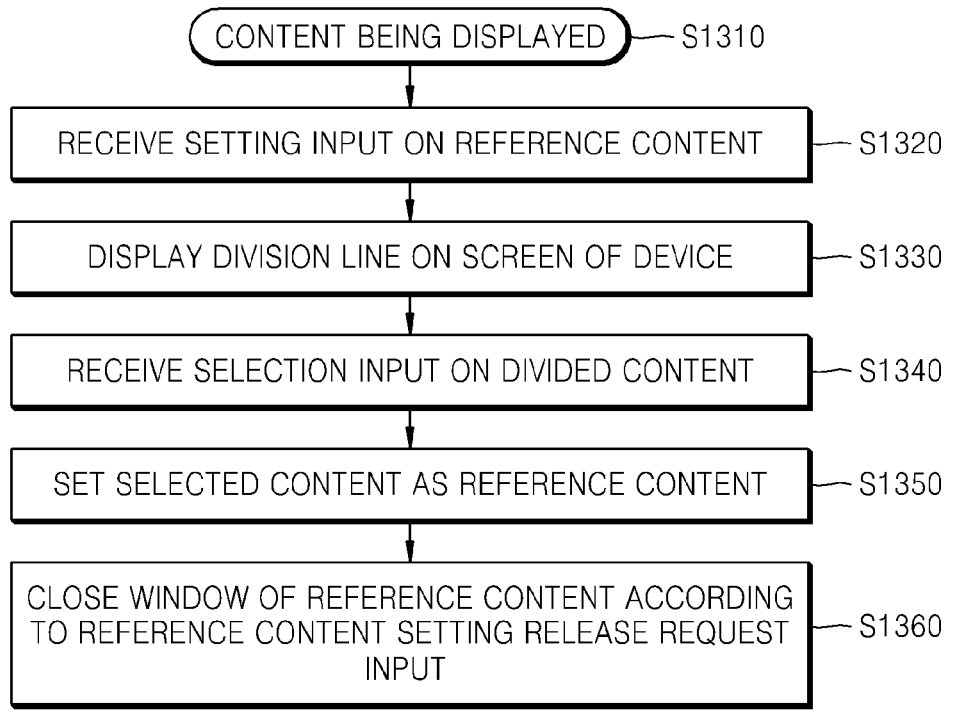
FIG. 13 is a flowchart of a method of displaying content, which is performed by a device, according to another exemplary embodiment.

FIG. 13 is a flowchart of a method of displaying content, which is performed by the device 100, according to another exemplary embodiment. In FIG. 13, an operation of releasing setting of reference content is added as compared to the method of FIG. 3.

Since operations S1310 through S1350 of FIG. 13 are substantially the same as operations S310 through S350 of FIG. 3, details thereof are not repeated here.

When a reference content setting release request input is received in operation S1360, the device 100 closes the window of reference content being displayed on the screen 110. The device 100 may store information about the reference content while closing the window of the reference content.

Figure 14:
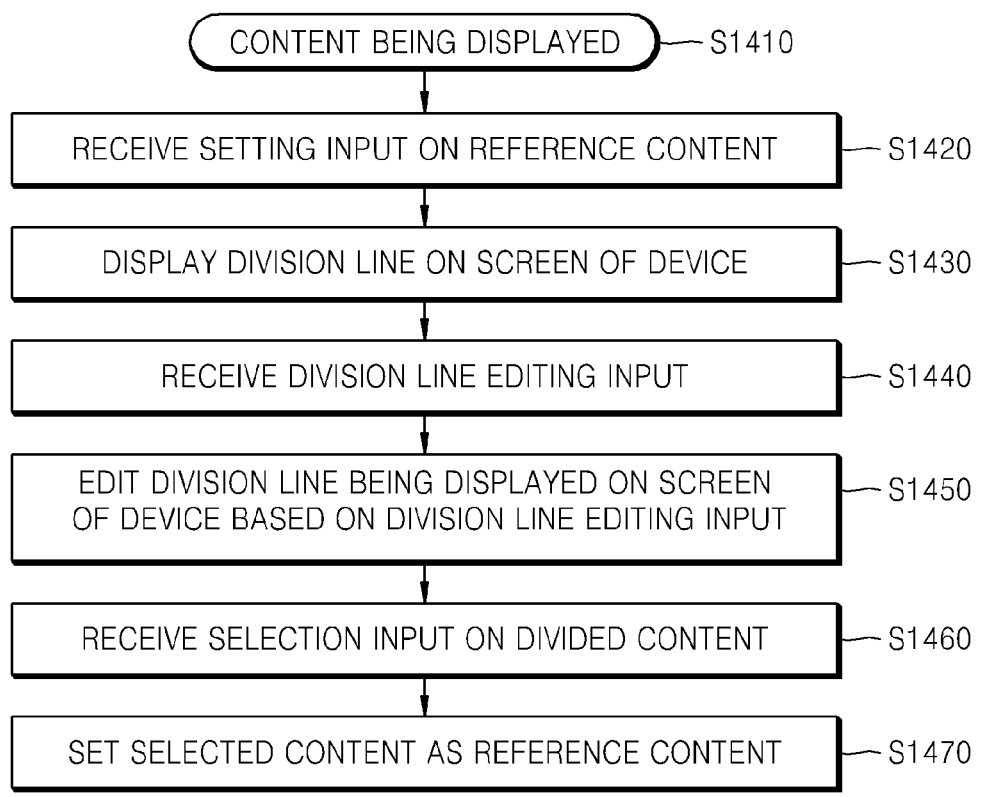
FIG. 14 is a flowchart of a method of displaying content, which is performed by a device, according to another exemplary embodiment.

FIG. 14 is a flowchart of a method of displaying content, which is performed by the device 100, according to another exemplary embodiment. In FIG. 14, an operation of editing a division line is added as compared to the method of FIG. 3.

Since operations S1410 through S1430, and operations S1460 and S1470 of FIG. 14 are substantially the same as operations S310 through S350 of FIG. 3, details thereof are not repeated here.

Upon receiving a division line editing input in operation S1440, the device 100 may edit the division line displayed on the screen 110 of the device 100 based on the division line editing input in operation S1450. The division line may be edited by adding or deleting a division line, dragging a division line, etc., although it is understood that one or more other exemplary embodiments are not limited thereto.

Figure 15:
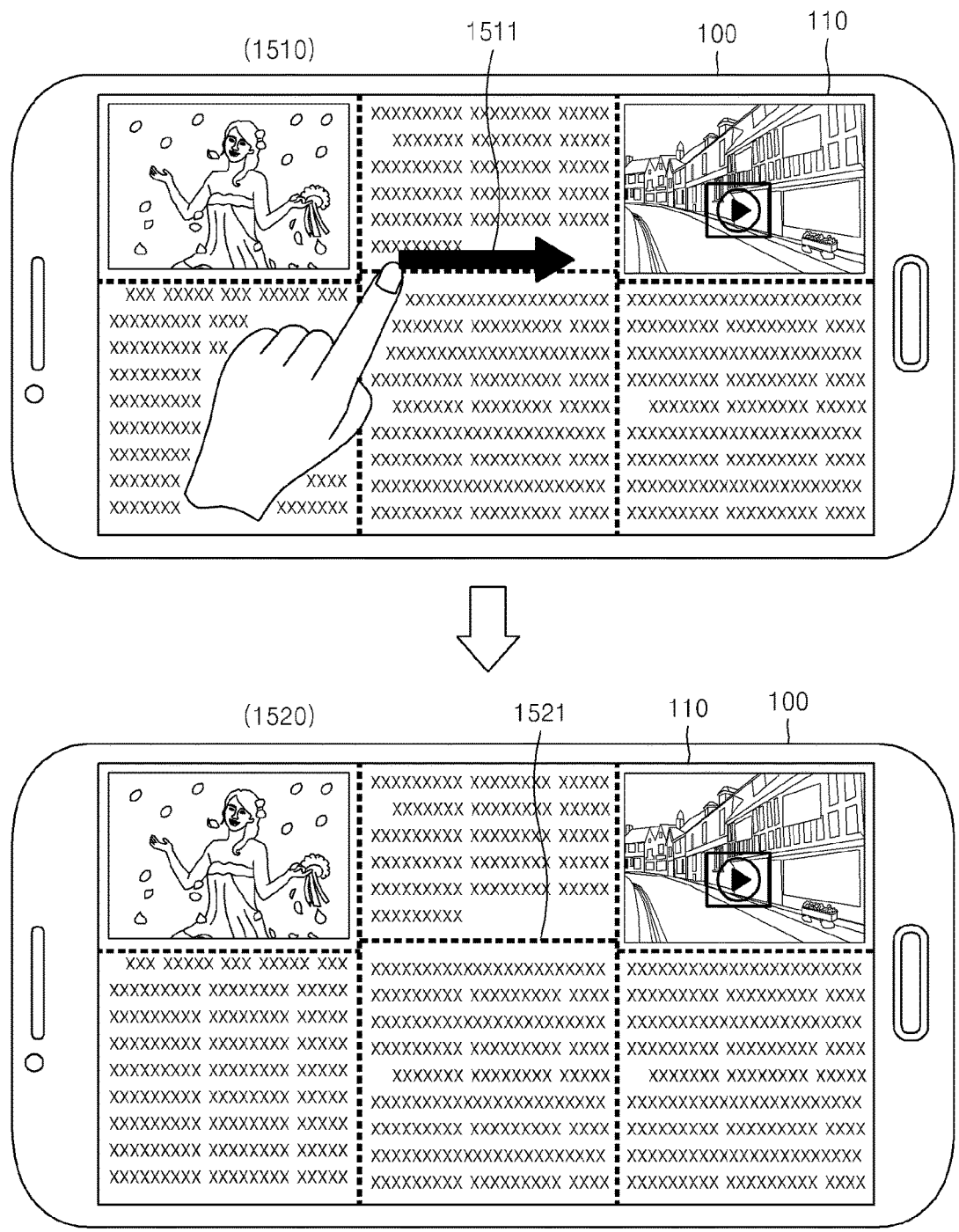
FIG. 15 is a diagram for describing a function of adding a division line, according to an exemplary embodiment.

FIG. 15 is a diagram for describing an operation of adding a division line, according to an exemplary embodiment.

When a division line setting input (or division line adding input) 1511 is received, after a division line is displayed on the screen 110 of the device 100, as shown in 1510 of FIG. 15, the device 100 displays an additional division line 1521 on the screen 110, as shown in 1520 of FIG. 15. The division line setting input may be performed via a touch gesture described above with reference to FIG. 5 at a display location, although it is understood that one or more other exemplary embodiments are not limited thereto.

Figure 16:
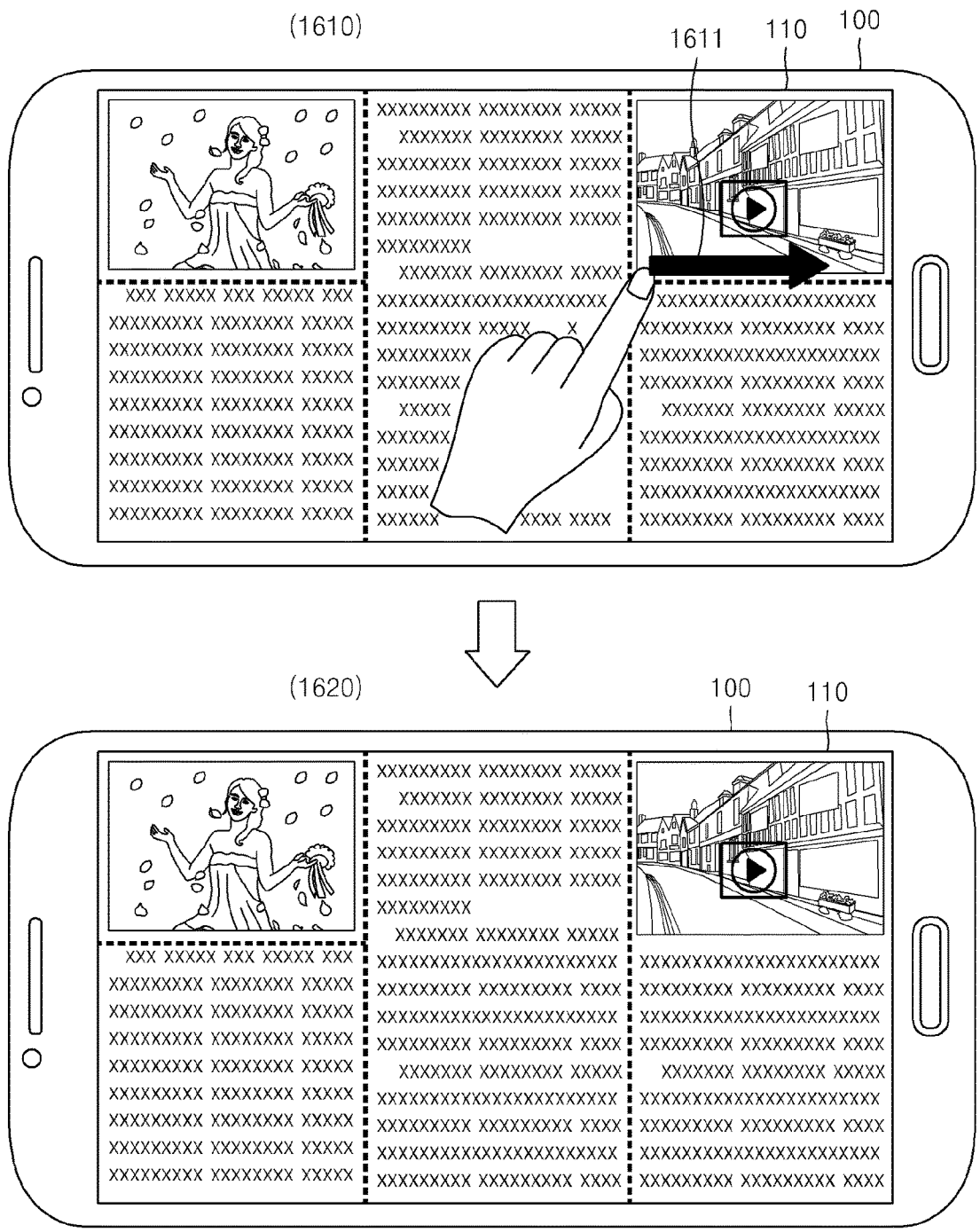
FIG. 16 is a diagram for describing a function of deleting a division line, according to an exemplary embodiment.

FIG. 16 is a diagram for describing an operation of deleting a division line, according to an exemplary embodiment.

When a delete input 1611 on a certain division line is received as shown in (1610) of FIG. 16 after the division line is displayed on the screen 110 of the device 100, the certain division line is deleted. Accordingly, a video and text below the video may be classified as one content.

The operation of deleting a division line may provide menu items for selecting an input for deleting all division lines or an input for partially deleting division lines. When the input for partially deleting division lines is selected, the division lines may be partially deleted, as shown in FIG. 16. When the input for deleting all division lines is selected, all division lines displayed on the screen 110 of the device 100 may be deleted at once. When all division lines are deleted, the screen 110 of the device 100 returns back to a display state before the division lines were displayed.

The operation of adding a division line and the operation of deleting a division line may be selected based on menu items. For example, when the division line editing input is received, the device 100 may display a menu window for selecting the operation for adding a division line and the operation for deleting a division line on the screen 110.

When the operation for adding a division line is selected through the menu window displayed on the screen 110, a division line may be additionally displayed, as shown in FIG. 15. When the operation for deleting a division line is selected through the menu window displayed on the screen 110, a displayed division line may be deleted, as shown in FIG. 16. By using such an operation of deleting a division line, the user may further accurately set desired reference content. While the inputs for adding and deleting one or more division lines are received via menu items in the present exemplary embodiment, it is understood that one or more other exemplary embodiments are not limited thereto. For example, according to another exemplary embodiment, one or more division lines may be selected and then deleted by a delete input.

Figure 17:
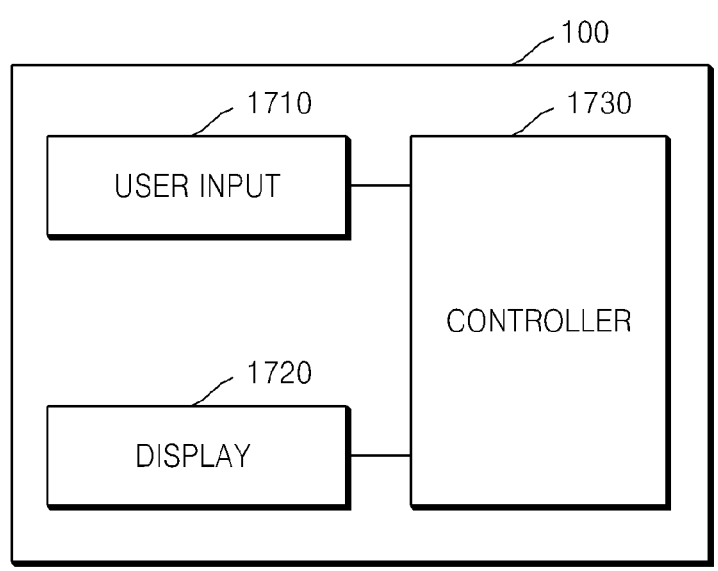
FIGS. 17 and 18 are block diagrams of a device according to exemplary embodiments.
Figure 18:
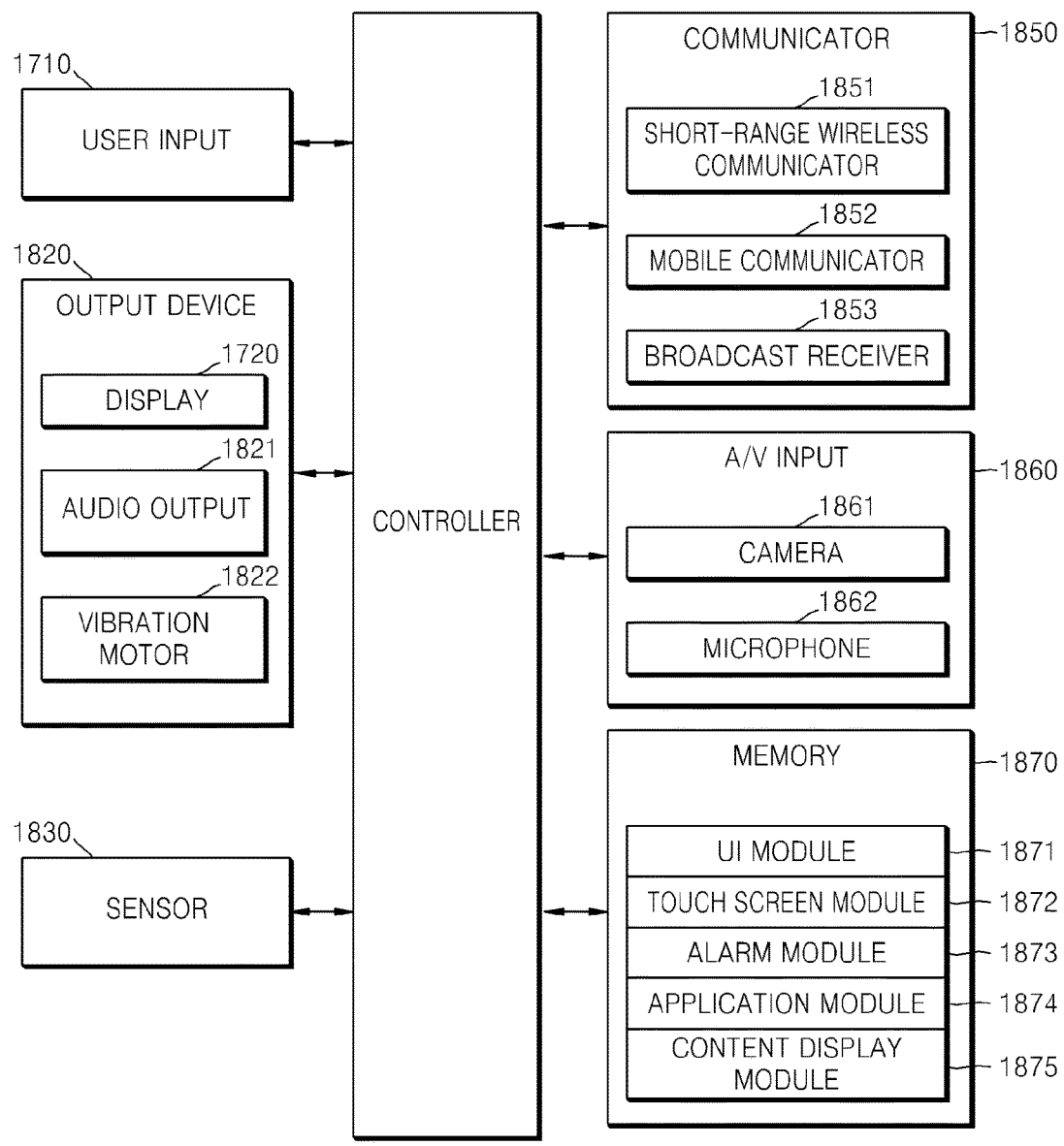

FIGS. 17 and 18 are block diagrams of the device 100 according to exemplary embodiments. Referring to FIG. 17, the device 100 may include a user input 1710 (e.g., a user input unit), a display 1720, and a controller 1730. It is understood that, in one or more other exemplary embodiments, the device 100 may include less or more than the elements shown in FIG. 17.

For example, as shown in FIG. 18, the device 100 may further include an output device 1820 including the display 1720, an audio output 1821, and a vibration motor 1822, a sensor 1830 (e.g., sensor module), a communicator 1850 (e.g., communication module), an audio/video (A/V) input 1860 (e.g., an A/V input module), and a memory 1870.

The user input 1710 shown in FIG. 17 may be a unit for receiving data for the user to control the device 100. For example, the user input 1710 may include at least one of a keypad, a dome switch, a touch screen or pad (e.g., a contact capacitance type, a pressure resistance film type, an infrared ray detecting type, a surface ultrasonic wave conducting type, an integral tension measuring type, a piezo-effect type, etc.), a jog wheel, a jog switch, etc., although it is understood that one or more other exemplary embodiments are not limited thereto.

The user input 1710 may receive a setting input on reference content while content is displayed on the display 1720, and may receive a selection input on content divided based on a division line while the division line is displayed on the display unit 1720. According to an exemplary embodiment, the user input 1710 may receive a hiding request input on reference content, an execution command on reference content, a note request input on reference content, a note hiding input on reference content, a reference content setting release input, and a division line editing input (division line setting input (input for adding a division line) and a division line delete input), although it is understood that one or more other exemplary embodiments are not limited thereto.

The output device 1820 may output an audio signal, a video signal, or a vibration signal, although it is understood that one or more other exemplary embodiments are not limited thereto. The output device 1820 may include the display 1720, the audio output 1821, and the vibration motor 1822, although it is understood that one or more other exemplary embodiments are not limited thereto.

The display 1720 may display information processed by the device 100. The display 1720 may correspond to the screen 110 described above according to one or more exemplary embodiments. The display 1720 may display the content, the reference content, the division line, and the note window of the reference content described above. The display 1720 may display menus according to a touch input.

When a touch screen is provided as the display 1720 and a touch pad forms a layer structure, the display 1720 may be used as an input device as well as an output device. The display 1720 may include at least one of a liquid crystal display, a thin film transistor-liquid crystal display, an organic light-emitting diode display, a flexible display, a three-dimensional (3D) display, and an electrophoretic display (EPD). The device 100 may include at least two displays 1720 according to a structure of the device 100. Here, the at least two display unit 1720 may face each other or be adjacent to each other by using a hinge.

The audio output 1821 outputs audio data received from the communicator 1850 or stored in the memory 1870. Also, the audio output 1821 outputs an audio signal related to an operation (for example, a call signal receiving sound, a message receiving sound, or an alarm) performed by the device 100. The audio output 1821 may include a speaker and a buzzer.

The vibration motor 1822 may output a vibration signal. For example, the vibration motor 1822 may output a vibration signal corresponding to an output of audio data or video data (for example, a call signal receiving sound or a message receiving sound). Also, when a touch is input on the touch screen, the vibration motor 1822 may output a vibration signal (e.g., haptic feedback).

The controller 1730 generally controls overall operations of the device 100. For example, the controller 1730 may control the user input 1710, the output device 1820, the sensor 1830, the communicator 1850, the A/V input 1860, and the memory 1870 by executing programs stored in the memory 1870. The controller 1730 may be referred to as a processor for performing or executing operations of the device 100.

When a setting input on reference content is received while content is displayed on the display 1720, the controller 1730 may display a division line indicating division of content included in a page that received the setting input, on the display 1720. Accordingly, the controller 1730 may generate the division line by analyzing a layout of the content included in the page that received the setting input, as described above with reference to operation S330 of FIG. 3. The division line displayed on the display 1720 is a virtual division line for guiding a user to select content. When a selection input on content divided based on the division line is received through the user input unit 1710, the controller 1730 may set the selected content as reference content.

The controller 1730 may display the selected content set as the reference content on a window that is independent from a window of content where the content is displayed.

When a hiding request input on a window of reference content is received through the user input unit 1710, the controller 1730 may set a display layer of the window of the reference content to be lower than a display layer of the window of the content to hide the window of the reference content. While hiding the window of the reference content, the controller 1730 may display a sign indicating a hidden state of the reference content on a display location in the window of the content, on a boundary line of the window of the content, or on a display location adjacent to the window of the content.

The controller 1730 may execute the reference content in the window of the reference content, upon receiving an execution command on the reference content through the user input 1710.

The controller 1730 may open a note window for inputting a note about the reference content, upon receiving a note request input on the reference content through the user input 1710. The controller 1730 may opaquely display the note window adjacent to the window of reference content.

When a hiding request input on the note window is received through the user input 1710, the controller 1730 may close the note window. When the note window is closed, the controller 1730 may display a sign indicating a hidden state of the note window on a display location in the window of the reference content, on a boundary line of the window of the reference content, or on a display location adjacent to the window of the reference content. When the note window is closed, the controller 1730 may store information about the reference content related to the note window and a comment of a user in the note window. Examples of the comment include text and a symbol, although it is understood that one or more other exemplary embodiments are not limited thereto.

When a setting release input on the reference content is received through the user input 1710, the controller 1730 may close the window of the reference content being displayed on the display 1720.

When a division line setting input is received through the user input 1710 after the division line is displayed on the display 1720, the controller 1730 may display an additional division line on the display 1720. When a division line delete input is received through the user input 1710 after the division line is displayed on the display 1720, the controller 1730 may delete the division line being displayed on the display 1720. The deleting of the division line may be performed by deleting the whole division line or partially deleting the division line.

The sensor 1830 may sense a state of the device 100 or a state around the device 100, and transmit the sensed state to the controller 1730.

The sensor 1830 may include at least one of a magnetic sensor, an acceleration sensor (e.g., accelerometer), a temperature/humidity sensor, an infrared ray sensor, a gyroscope sensor, a location sensor (e.g., a global positioning system (GPS) sensor), an atmospheric pressure sensor, a proximity sensor, a red, green, blue (RGB) sensor such as an illuminance sensor, an image sensor, a heart rate sensor, etc. Since operations of each sensor are understood by one of ordinary skill in the art, details thereof are omitted here.

The communicator 1850 may include at least one component enabling communication between the device 100 and an external device, or between the device 100 and a server. For example, the communicator 1850 may include a short-range wireless communicator 1851, a mobile communicator 1852, and a broadcast receiver 1853.

Examples of the short-range wireless communicator 1851 include a Bluetooth communication unit, a Bluetooth low energy (BLE) communication unit, a near field communication (NFC) unit, a wireless local area network (or WiFi) communication unit or adapter, a ZigBee communication unit, an infrared data association (IrDA) communication unit, a WiFi direct (WFD) communication unit, an ultra wideband (UWB) communication unit, an Ant+ communication unit, a radio frequency communication unit, etc.

The mobile communicator 1852 transmits and receives a wireless signal to and from at least one of a base station, an external terminal, and a server, on a mobile communication network. Here, the wireless signal may include various types of data according to transmission and reception of a voice call signal, a video call signal, a text/multimedia message, etc.

The broadcast receiver 1853 receives a broadcast signal and/or information related to a broadcast through a broadcast channel from an external source. Examples of the broadcast channel include a satellite channel and a terrestrial channel. The device 100 may not include the broadcast receiver 1853 according to another exemplary embodiment.

The A/V input 1860 is used to receive an audio signal or a video signal, and may include a camera 1861 and a microphone 1862. The camera 1861 may obtain an image frame of a still image or moving image through an image sensor, in a video call mode or a photographing mode. An image captured through the image sensor may be processed by the controller 1730 or a separate image processor.

An image frame processed by the camera 1861 may be stored in the memory 1870 or externally transmitted through the communicator 1850. The device 100 may include at least two cameras 1861 according to a structure of the device 100.

The microphone 1862 receives an external audio signal and converts the received external audio signal to electric voice data. For example, the microphone 1862 may receive an audio signal from an external device or a speaker. The microphone 1862 may use any one of various noise removing algorithms to remove noise generated while receiving the external audio signal.

The memory 1870 may store programs, software, code, algorithms, etc., of processes and controls performed by the controller 1730, and may store input/output data, such as reference content, a note on reference content, and mapping information between reference content and a note. The memory 1870 may store layout information of content. The layout information may be classified and stored in a page unit.

The memory 1870 may include at least one storage medium, such as a flash memory, a hard disk, a multimedia card micro type memory, a card type memory such as a secure digital (SD) card or extreme digital (XD) card, random access memory (RAM), static RAM (SRAM), read-only memory (ROM), electrically erasable programmable ROM (EEPROM), programmable ROM (PROM), a magnetic memory, a magnetic disk, an optical disk, etc. Also, the device 100 may use a web storage or a cloud server for performing a storage operation of the memory 1870 on the Internet.

Programs stored in the memory 1870 may be classified into a plurality of modules according to operations. For example, the programs may be classified into a user interface (UI) module 1871, a touch screen module 1872, an alarm module 1873, an application module 1874, and a content display module 1875. The content display module 1875 may be included in the application module 1874. The content display module 1875 may include a content reproduction application or a content reader application.

The UI module 1871 may provide a specialized UI or a specialized graphical UI (GUI) interworking with the device 100, according to applications. The touch screen module 1872 may detect a touch gesture on a touch screen, and transmit information about the touch gesture to the controller 1730. The touch screen module 1872 may detect a touch gesture indicating setting, hiding, or releasing of reference content, according to an exemplary embodiment. The touch screen module 1872 may be configured as separate hardware including a controller.

In order to detect a touch or a proximity touch on the touch screen, various sensors may be disposed in or around the touch screen. For example, a tactile sensor may be used to sense a touch on the touch screen. The tactile sensor detects a contact on a certain object in a degree that is felt by a person. The tactile sensor may detect various types of information, such as roughness on a contact surface, hardness of a contact object, and a temperature at a contact point.

A proximity sensor may be used to sense a touch on the touch screen. The proximity sensor detects an object approaching or near a predetermined detection surface by using an electromagnetic field force or infrared ray, without having to use a mechanical contact. Examples of the proximity sensor include a transmission photoelectric sensor, a direct reflective photoelectric sensor, a mirror reflective photoelectric sensor, a high frequency oscillation type proximity sensor, a capacitance type proximity sensor, a magnetic type proximity sensor, an infrared proximity sensor, etc. Examples of the touch gesture of the user include tapping, touching and holding, double tapping, dragging, panning, flicking, dragging and dropping, swiping, multi-finger touching, etc.

The alarm module 1873 may generate a signal for notifying an occurrence of an event of the device 100. Examples of an occurrence of an event of the device 100 include call signal reception, message reception, key signal input, schedule notification, etc. The alarm module 1873 may output an alarm signal in a video signal form through the display 1720, in an audio signal form through the audio output 1821, or in a vibration signal form through the vibration motor 1822.

Figure 19:
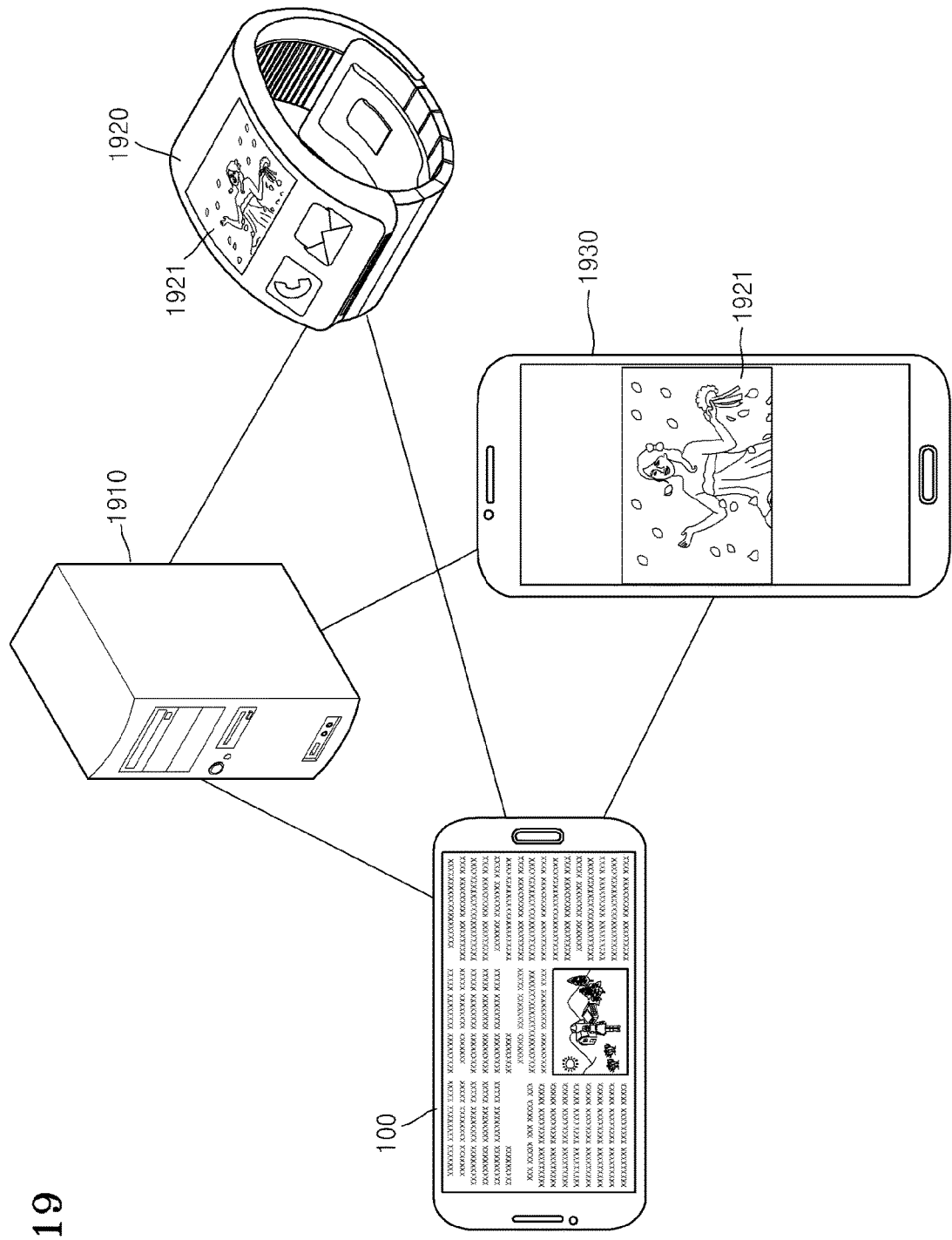
FIG. 19 is a diagram for describing a system for displaying content, according to an exemplary embodiment.

FIG. 19 is a diagram for describing a system for displaying content, according to an exemplary embodiment.

Referring to FIG. 19, reference content 1921 set by the device 100 may be transmitted to at least one of a server 1910, an accessory 1920 of the device 100, or a mobile terminal 1930.

The server 1910 may manage reference content set according to contents. Accordingly, the device 100 may transmit information about related content while transmitting the reference content. The device 100 may assign identification information to the reference content and transmit the identification information to the server 1910.

The server 1910 may prepare a list of received reference contents by using the identification information on the reference contents. The list may include information to be referred to by the user to select reference content, and information for searching for reference content managed by the server 1910, although it is understood that one or more other exemplary embodiments are not limited thereto.

The user may view the reference content managed by the server 1910 by connecting to the server 1910 using the device 100 or another device. For example, when the list of reference contents is managed by the server 1910, the user may download the list and selectively view reference content by using the device 100 or the other device. Since a device of another user may connect to the server 1910 for the other user to view the reference content, the reference content may be shared between the user and the other user. The other user may be a user permitted by the user of the device 100.

The device 100 may also transmit information about a note on the reference content to the server 1910. Accordingly, the server 1910 may manage the information about the note on the reference content. When a plurality of notes are assigned to one reference content, the server 1910 may provide information selectable by the user by using identification information of the plurality of notes to the device 100. Accordingly, the user may determine that the plurality of notes are mapped to one reference content, and selectively view one of the plurality of notes. The server 1910 may include a cloud server or a content managing server.

The accessory 1920 and the mobile terminal 1930 may be other devices owned or operated by the user of the device 100. By transmitting the reference content 1921 set by the device 100 to the accessory 1920 or the mobile terminal 1930, the user may view content through the device 100 while viewing the reference content 1921 through the accessory 1920 or the mobile terminal 1930. The accessory 1920 may be a device or an electronic accessory having a display function and worn by the user, such as an electronic watch (e.g., smart watch), an electronic bracelet, or electric glasses, although it is understood that one or more other exemplary embodiments are not limited thereto. The accessory 1920 and the mobile terminal 1930 may receive the reference content 1921 from the server 1910.

The mobile terminal 1930 may include a device that has similar operations as, but a different standard from, the device 100. For example, the device 100 may be a tablet, and the mobile terminal 1930 may be a smart phone.

Figure 20:
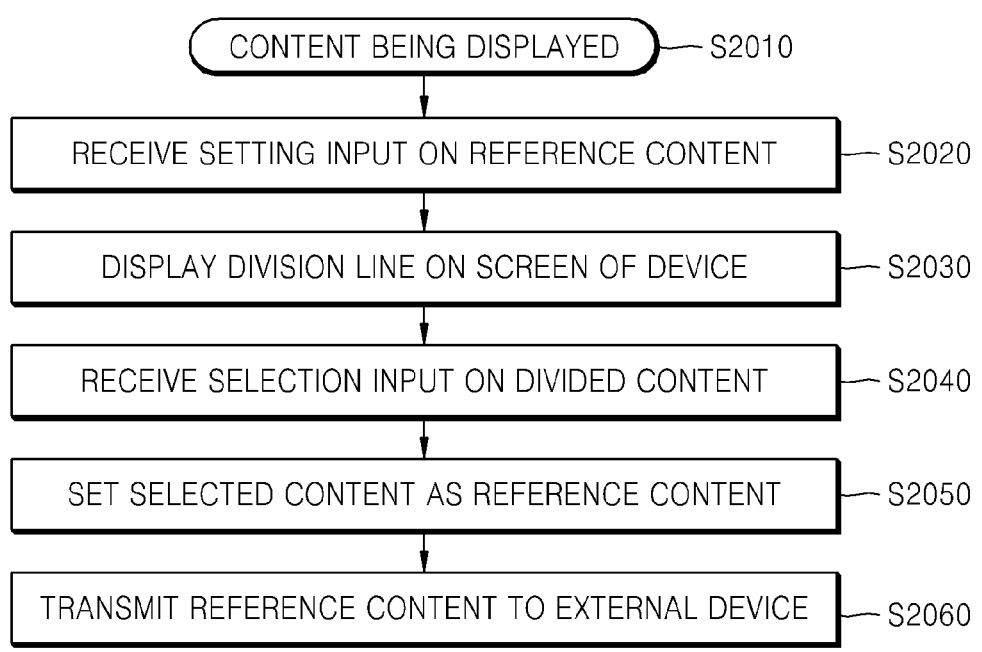
FIG. 20 is a flowchart of operations of a device based on the system of FIG. 19.

FIG. 20 is a flowchart of operations of the device 100 based on the system of FIG. 19. In FIG. 20, an operation of transmitting reference content to an external device is added as compared to the method of FIG. 3.

Since operations S2010 through S2050 are substantially the same as operations S310 through S350 of FIG. 3, details thereof are not repeated here.

In operation S2060, the device 100 transmits the set reference content to an external device. The external device may include at least one of the server 1910, the accessory 1920, and the mobile terminal 1930 of FIG. 19.

When information is transmitted to the server 1910, the device 100 may, for example, transmit the reference content to the server 1910 through the Internet. The transmitted information may include at least one of reference content, content related to the reference content, location information of the reference content, and identification information of the reference content, although it is understood that one or more other exemplary embodiments are not limited thereto.

When information is transmitted to at least one of the accessory 1920 and the mobile terminal 1930, the device 100 may transmit information related to the reference content to at least one of the accessory 1920 and the mobile terminal 1930 by using one of the communication methods described above with reference to the short-range wireless communicator 1851.

The device 100 according to an exemplary embodiment sets reference content and enables a user to simultaneously view content and the reference content on one screen, such that the user views the reference content without having to search for the reference content to be referred to while viewing the content.

The device 100 according to an exemplary embodiment enables a user to easily view reference content whenever the user views content by managing a plurality of reference contents through the server 1910, to view a related comment (i.e., note information) of the user, and share the comment and the reference content with another user. When the device 100 manages information about reference content, the user may share the reference content and the comment by connecting a device of the other user to the device 100 with or without using the server 1910.

Since the device 100 according to an exemplary embodiment transmits reference content to an external device interworking with the device 100, a user is able to simultaneously view the reference content and content by using the device 100 and the external device.

The methods described above may be stored on a computer-readable recording medium by being realized in computer programs executed by using various computers. The computer-readable recording medium may include at least one of program commands, a data file, and a data structure. The program commands recorded in the computer-readable recording medium may be specially designed or well known to one of ordinary skill in the computer software field. Examples of the computer-readable recording medium include read-only memory (ROM), random-access memory (RAM), CD-ROMs, magnetic tapes, floppy disks, optical data storage devices, etc. Examples of the computer command include mechanical codes prepared by a compiler, and high-level languages executable by a computer by using an interpreter. Additionally, it is understood that one or more of the above-described elements may include at least one of circuitry, a processor, a microprocessor, etc. Furthermore, while the above-described exemplary embodiments are with reference to a device including a display, it is understood that one or more other exemplary embodiments are not limited thereto, and may be applicable to an image processing device that outputs an image to an external display device (e.g., a set-top box, an audio/video receiver, a computer device, etc.)

While one or more exemplary embodiments have been described with reference to the figures, it will be understood by those of ordinary skill in the art that various changes in form and details may be made therein without departing from the spirit and scope of the present invention as defined by the following claims.

What is claimed is:

1. A method of displaying content by using a device, the method comprising:
   receiving a setting input for reference content via a user input interface of the device when content is displayed on a display of the device;
   displaying, on the display, a division line indicating division of the content based on layout information of the content included in a page that received the setting input;
   receiving a selection input for a content from among contents divided based on the division line via the user input interface; and
   displaying, on a second window of the display, the content selected based on the selection input as the reference content,
   wherein the second window of the display is independent from a first window of the display on which the content is displayed, such that the content of the first window is moved independently of the reference content of the second window,
   wherein a display layer of the second window is different than the display layer of the first window, and in response to the display layer of the second window being higher than the display layer of the first window, the content of the first window comprises content that is hidden by the reference content of the second window and content that is not hidden by the reference content, and
   wherein the method further comprises, in response to receiving a hiding request input for the reference content via the user input interface, setting the display layer of the second window to be lower than the display layer of the first window such that the first window completely hides the second window, and displaying an indicator at an edge of the first window that indicates a hidden state of the second window while the second window is completely hidden.

2. The method of claim 1, wherein the division line is a virtual division line.

3. The method of claim 1, further comprising displaying the indicator that indicates a hidden state of the second window on at least one of a display location in the first window, a boundary line of the first window, and a display location adjacent to the first window.

4. The method of claim 1, further comprising, in response to receiving an execution command for the reference content via the user input interface, executing the reference content in the second window.

5. The method of claim 1, further comprising, in response to receiving a note request input for the reference content via the user input interface, opening a third window for inputting a note for the reference content.

6. The method of claim 5, wherein the opening the third window comprises opaquely displaying the third window adjacent to or on the second window.

7. The method of claim 5, further comprising, in response to receiving a hiding request input for the third window via the user input interface, hiding or closing the third window.

8. The method of claim 5, further comprising, in response to receiving a hiding request input for the third window via the user input interface, hiding or closing the third window and displaying an indicator that indicates a hidden state of the third window on at least one of a display location in the second window, a boundary line of the second window, and a display location adjacent to the second window.

9. The method of claim 1, further comprising displaying the second window on a display layer that is higher than the display layer of the first window.

10. The method of claim 1, further comprising, in response to receiving a setting release input for the reference content via the user input interface, closing the second window.

11. The method of claim 1, further comprising displaying an indicator that indicates the reference content on at least one of a display location in the second window, a boundary line of the second window, and a display location adjacent to the second window.

12. The method of claim 1, further comprising, after the division line is displayed, displaying an additional division line on the display in response to receiving a division line setting input via the user input interface.

13. The method of claim 1, further comprising, after the division line is displayed, deleting a part or all of the division line in response to receiving a division line delete input via the user input interface.

14. The method of claim 1, wherein a display of the reference content is maintained on the display while the content displayed on the display changes.

15. The method of claim 1, further comprising outputting the reference content to an external display device.

16. A non-transitory computer-readable recording medium having recorded thereon a program for executing the method of claim 1.

17. A device comprising:
a user input interface configured to receive a setting input for reference content;
a display; and
a processor configured to:
receive the setting input for the reference content while content is displayed on the display via the user input interface;
control the display to display, on the display, a division line indicating division of the content based on layout information of the content included in a page that received the setting input;
receive a selection input for a content from among contents divided based on the division line via the user input interface; and
control the display to display, on a second window, content selected based on the selection input as the reference content,
wherein the second window of the display is independent from a first window of the display on which the content is displayed, such that the processor is configured to move the content of the first window independently of the reference content of the second window, and
wherein the processor is further configured to:
control a display layer of the second window to be different than the display layer of the first window, and in response to the display layer of the second window being higher than the display layer of the first window, the content of the first window comprises content that is hidden by the reference content of the second window and content that is not hidden by the reference content; and
in response to receiving a hiding request input for the second window through the user input interface, set the display layer of the second window to be lower than the display layer of the first window such that the first window completely hides the second window, and control the display to display an indicator at an edge of the first window that indicates a hidden state of the second window while the second window is completely hidden.

18. The device of claim 17, wherein the division line is a virtual division line.

19. The device of claim 17, wherein the processor is further configured to control the display to display the indicator that indicates a hidden state of the second window on at least one of a display location in the first window, a boundary line of the first window, and a display location adjacent to the first window.

20. The device of claim 17, wherein the processor is further configured to, in response to receiving an execution command for the reference content through the user input interface, execute the reference content in the second window.

21. The device of claim 17, wherein the processor is further configured to, in response to receiving a note request input for the reference content through the user input interface, open a third window for inputting a note for the reference content.

22. The device of claim 21, wherein the third window is opaquely displayed at a location adjacent to or on the second window.

23. The device of claim 21, wherein the processor is further configured to, in response to receiving a hiding request input for the third window through the user input interface, hide or close the third window.

24. The device of claim 21, wherein the processor is further configured to, in response to receiving a hiding request input for the third window through the user input interface, hide or close the third window and control the display to display an indicator that indicates a hidden state of the third window on at least one of a display location in the second window, a boundary line of the second window, and a display location adjacent to the second window.

25. The device of claim 17, wherein the processor is further configured to control the display to display the second window on a display layer that is higher than the display layer of the first window.

26. The device of claim 17, wherein the processor is further configured to, in response to receiving a setting release input for the reference content through the user input interface, close the second window.

27. The device of claim 17, wherein the processor is further configured to control the display to display an indicator that indicates the reference content on at least one of a display location in the second window, a boundary line of the second window, and a display location adjacent to the second window.

28. The device of claim 17, wherein the processor is further configured to, after the division line is displayed, control the display to display an additional division line on the display in response to receiving a division line setting input through the user input interface.

29. The device of claim 17, wherein the processor is further configured to, after the division line is displayed, delete a part or all of the division line in response to receiving a division line delete input through the user input interface.

* * * * *